(12) United States Patent
Sahay et al.

(10) Patent No.: US 10,673,981 B2
(45) Date of Patent: Jun. 2, 2020

(54) WORKLOAD REBALANCING IN HETEROGENEOUS RESOURCE ENVIRONMENTS

(71) Applicant: Nutanix, Inc., San Jose, CA (US)

(72) Inventors: Manjul Sahay, Cupertino, CA (US); Ramesh U. Chandra, Santa Clara, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/619,180

(22) Filed: Jun. 9, 2017

(65) Prior Publication Data
US 2020/0028935 A1 Jan. 23, 2020

(51) Int. Cl.
| G06F 15/173 | (2006.01) |
| H04L 29/08 | (2006.01) |
| G06F 9/50 | (2006.01) |
| G06F 9/455 | (2018.01) |
| G06F 9/48 | (2006.01) |

(52) U.S. Cl.
CPC .......... H04L 67/32 (2013.01); G06F 9/45558 (2013.01); G06F 9/4856 (2013.01); G06F 9/5083 (2013.01); H04L 67/1002 (2013.01); G06F 2009/4557 (2013.01); G06F 2009/45562 (2013.01)

(58) Field of Classification Search
CPC ... H04L 29/08072; H04L 29/06; H04L 47/48; H04L 67/1002
USPC .................................. 709/203, 220, 224, 227
See application file for complete search history.

(56) References Cited

U.S. PATENT DOCUMENTS

| 8,102,781 | B2 | 1/2012 | Smith |
| 8,549,518 | B1 | 10/2013 | Aron et al. |
| 8,601,473 | B1 | 12/2013 | Aron et al. |
| 8,850,130 | B1 | 9/2014 | Aron et al. |
| 8,997,097 | B1 | 3/2015 | Aron et al. |
| 9,052,936 | B1 | 6/2015 | Aron et al. |

(Continued)

OTHER PUBLICATIONS

"CloudCenter™ Full Lifecycle Management". CliQr. Jun. 24, 2015. 11 pages.

(Continued)

Primary Examiner — Khanh Q Dinh
(74) Attorney, Agent, or Firm — Vista IP Law Group, LLP

(57) ABSTRACT

Techniques for rebalancing computing workloads between a set of on-premises resources of an on-premises system and a set of cloud computing resources of a cloud computing system. A method embodiment commences upon detecting a rebalancing trigger event. Responsive to the trigger event, a set of resource data corresponding to observations pertaining to the on-premises resources and resource data corresponding to observations pertaining the cloud resources is accessed. Based at least in part on the resource data, a plurality of candidate workload rebalancing plans are generated. The candidate workload rebalancing plans are evaluated against the likelihood of achieving quantitative objectives resulting from the rebalancing. A portion of the scheduling commands to carry out the workload rebalancing plans are sent to the cloud computing system, and another portion of the scheduling commands are sent to the on-premises computing system. The receiving computing systems carry out the scheduling commands.

22 Claims, 15 Drawing Sheets

(56) References Cited

U.S. PATENT DOCUMENTS

| | | | |
|---|---|---|---|
| 9,256,374 B1 | 2/2016 | Aron et al. | |
| 9,256,475 B1 | 2/2016 | Aron et al. | |
| 9,354,912 B1 | 5/2016 | Aron et al. | |
| 9,389,887 B1 | 7/2016 | Aron et al. | |
| 9,569,277 B1* | 2/2017 | Cropper | G06F 9/5083 |
| 9,575,784 B1 | 2/2017 | Aron et al. | |
| 9,600,345 B1* | 3/2017 | Cropper | G06F 9/5083 |
| 9,619,257 B1 | 4/2017 | Aron et al. | |
| 9,772,866 B1 | 9/2017 | Aron et al. | |
| 9,880,885 B2* | 1/2018 | Sundararajan | H04L 67/1008 |
| 10,146,593 B2* | 12/2018 | Gong | G06F 9/5072 |
| 10,157,085 B2* | 12/2018 | Gong | G06F 9/5072 |
| 10,341,370 B2* | 7/2019 | Gladstone | H04L 63/1441 |
| 2008/0177974 A1* | 7/2008 | Chiang | G06F 12/1036 |
| | | | 711/173 |
| 2010/0287548 A1 | 11/2010 | Zhou et al. | |
| 2014/0337921 A1* | 11/2014 | Hanna, Jr. | H04L 63/08 |
| | | | 726/3 |
| 2016/0226788 A1* | 8/2016 | Chittigala | G06F 9/50 |
| 2016/0226789 A1* | 8/2016 | Sundararajan | G06F 9/5083 |
| 2016/0246866 A1* | 8/2016 | Doshi | G06F 11/203 |
| 2016/0269378 A1* | 9/2016 | Ye | G06N 3/0454 |
| 2016/0358249 A1* | 12/2016 | Iyer | G06Q 30/08 |
| 2017/0097841 A1* | 4/2017 | Chang | H04L 67/10 |
| 2018/0167300 A1* | 6/2018 | Yuan | H04L 41/12 |

OTHER PUBLICATIONS

"On-premise vs. cloud-based solutions". GFI Software. 6 pages.
"On-premise vs. cloud-based solutions". GFI Software. 2010. 9 pages.
Vmware Cluster DRS. 1 page.
Bhattacharya, S. et al, "Virtual Machine Load Balancing overview", Microsoft Docs, Sep. 18, 2016, pp. all.
Murphy, A., "Enabling Long Distance Live Migration with F5 and VMware vMotion", Copyright 2015, pp. all.
VMware: "vSphere Basic System Administration", Copyright 2009-2011, pp. all.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.

* cited by examiner

WORKLOAD REBALANCING IN HETEROGENEOUS RESOURCE ENVIRONMENTS

RELATED APPLICATIONS

The present application is related to co-pending U.S. patent application Ser. No. 15/619,146 titled "WORKLOAD SCHEDULING IN HETEROGENEOUS RESOURCE ENVIRONMENTS", filed on even date herewith, which is hereby incorporated by reference in its entirety.

FIELD

This disclosure pertains to managing computing resources, and more particularly to managing computing resources in heterogeneous resource environments.

BACKGROUND

System administrators who manage the placement of computing workloads have many resource environment choices to consider. In some cases, selected workloads can be assigned to a dedicated set of computing, storage, networking, and/or other resources (e.g., "on-prem" or "on-premises" resources). Servers with particularly-configured computing resources (e.g., multi-core processors) and with a certain attached storage capacity might be implemented to run the selected workloads. On-premises resources are sometimes configured in a computing system using virtualization software to facilitate flexibility in the use of the computing resources. Such computing systems, in particular, virtualized computing and storage systems implement various types of virtualized entities (VEs) to run the workloads that use or consume the computing resources of the systems.

The VEs deployed in many virtualization systems might be virtual machines (VMs) and/or executable containers. With as many as several thousand VEs per cluster, the high storage I/O (input/output or IO) demand of the VEs has precipitated an increase in deployment of distributed storage systems to replace centralized storage configurations. Distributed storage systems coordinate certain components in the system to efficiently use a particular set of data storage resources or facilities to service the workloads. Distributed resource environments natively combine distributed computing and/or distributed storage capabilities and/or networking capabilities, and/or other distributed capabilities that can be linearly scaled by adding nodes.

Cloud-based resource environments are also available to today's system administrators. In particular, public cloud resources can be selected from a variety of cloud providers to satisfy temporary or long term workload requirements. For example, a cloud resource provider might offer a service model that provides infrastructure as a service (IaaS), which service model or infrastructure can be used by various sets of VEs when performing certain workloads. The characteristics of both the on-premises resources and the public cloud resources can change dynamically. For example, the availability, configuration, cost, and/or other characteristics of such resources can vary quickly and broadly, both within a given resource environment and across these heterogeneous environments.

Unfortunately, legacy techniques for scheduling workloads across resource environments can present limitations at least as pertaining to efficient distribution of the workloads into the environments pertaining to on-premises distributed resource environments and public cloud resource environments. Some legacy techniques merely facilitate workload scheduling within a particular resource environment, and some legacy techniques require a system administrator to specify where and when and how a particular workload is to be scheduled. Such legacy techniques fail to consider the functionally-changing and temporally-changing capabilities of different resources and/or variations between different resource environments when determining workload scheduling plans. Workload scheduling using the legacy techniques are deficient in satisfying certain objectives, at least as compared to workload scheduling that accounts for variations between different resources and/or variations between different resource environments. For example, scheduling a temporary workload peak for a public cloud resource environment may be more effective in meeting certain business objectives such as cost reduction or on-time delivery as compared to scheduling the workload peak to on-premises resources that would need to be purchased and installed.

Furthermore, legacy techniques for scheduling workloads across resource environments present limitations at least as pertaining to rebalancing of workloads across highly dynamic heterogeneous resource environments. Some legacy techniques merely facilitate a one-time allocation of workloads to a respective resource environment. For example, 80% of the workloads as measured by one or more resource usage metrics might be allocated to the on-premises resource environment and 20% of the workloads might be allocated to the public cloud resource environment. Such legacy techniques fail to account for the highly dynamic characteristics of such resource environments and/or characteristics of workloads running within those resource environments. Failure to account for such changes in environments or workloads can in turn reduce the efficacy of any earlier determined workload allocations. Limitations of legacy techniques are quite apparent when either the "on-prem" distributed resource environment or the public cloud resource environments undergo frequent environmental and/or operational changes.

What is needed is a technical solution to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for scheduling workloads across highly dynamic heterogeneous resource environments, which techniques advance the relevant technologies to address technological issues with legacy approaches. More specifically, the present disclosure provides a detailed description of techniques used in systems, methods, and in computer program products for scheduling workloads across highly dynamic heterogeneous resource environments. Certain embodiments are directed to technological solutions for continually monitoring resource requirements and capacity from multiple heterogeneous resource environments to determine workload scheduling operations according to one or more objectives and/or constraints.

The disclosed embodiments modify and improve over legacy approaches. In particular, the herein-disclosed techniques provide technical solutions that address the technical problems attendant to efficient distribution of workloads across highly dynamic on-premises computing environments and cloud-based resource environments or vice-versa. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of hyper-converged computing platform management as well as advances in various technical fields related to cloud computing.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
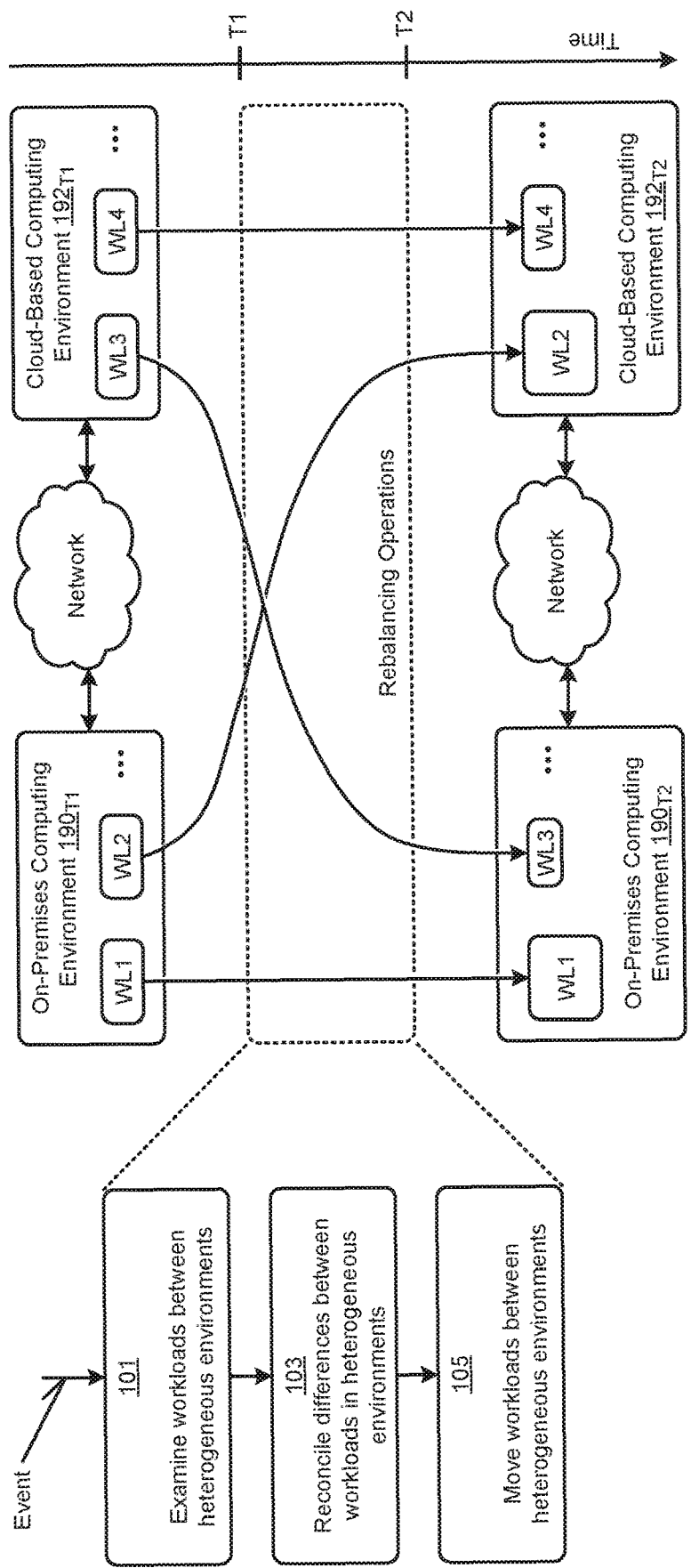
FIG. 1A shows the effects of workload rebalancing between heterogeneous environments, according to an embodiment.

Embodiments in accordance with the present disclosure address the problem of efficient distribution of workloads across highly dynamic distributed resource environments and cloud-based resource environments. Some embodiments are directed to approaches for continually monitoring resource requirements and capacity from multiple heterogeneous resource environments to determine workload scheduling operations that are based at least in part on then-current conditions with respect to performance and/or operational objectives and/or constraints. The accompanying figures and discussions herein present example environments, systems, methods, and computer program products for managing computing workloads across heterogeneous resource environments.

Overview

Disclosed herein are techniques for continuously collecting resource data from multiple heterogeneous resource environments to determine workload placement plans that comport with rapidly-changing environments, and/or rapidly-changing objectives and/or constraints. In certain embodiments, resource environment characteristics and ongoing usage data from on-premises and public cloud resource environments are monitored, stored, and analyzed. Responsive to certain workload placement requests or other events, the monitored and collected data can be analyzed to determine a workload placement plan that considers all available resource environments. The workload placement plan is then subjected to scheduling algorithms for deploying workloads to and/or for configuring the heterogeneous resource environments. In certain embodiments, a multi-objective analysis can be used to determine a particular workload placement plan based at least in part on the foregoing collected data. The multi-objective analysis can include consideration of various constraints such as those pertaining to security, location, and/or other characteristics.

Also disclosed herein are techniques for analyzing resource environment data and resource usage data, which analysis is invoked responsive to detected triggers across multiple heterogeneous resource environments. A trigger and/or triggered analysis can be used to determine and initiate workload rebalancing plans (e.g., in accordance with then-current conditions and/or quantitative objectives and/or quantitative constraints). In certain embodiments, resource environment data from on-premises and public cloud resource environments, as well as workload resource usage data, are continually monitored and stored for rapid access from any environment. As used herein, an on-premises computing system includes a network connection to a cloud computing system. On-premises computing systems are computing systems that host software to run on computers that are situated in the same building as is the person or organization using the software rather than at a remote facility such as a distally situated server farm or cloud. In many cases an on-premises computing system also includes storage capabilities, computing capabilities, intra-system networking capabilities, and/or other capabilities. In some cases, the entire on-premises set of resources can be physically bounded in a site, data center, cluster, and/or another physical grouping (e.g., node, set of nodes, etc.). The business entity (e.g., enterprise) that owns and/or controls the computing system can be considered the resource provider of on-premises resources.

The collected resource environment data and resource usage data can be analyzed to determine a workload rebalancing plan across all available resource environments, even when only one of the environments raised a trigger event. In some embodiments, the analysis algorithm and/or the corpus of data to be analyzed can be selected based at least in part on the timing and/or other characteristics of the detected rebalancing trigger.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A shows the effects of workload rebalancing between heterogeneous environments. As shown, at a first time (e.g., time=T1) computing workloads WL1 and WL2 are situated within an on-premises computing environment $190_{T1}$ and computing workloads WL3 and WL4 are situated within a cloud-based computing environment $192_{T1}$. At some moment in time (e.g., between time=T1 and time=T2), the workloads might become unbalanced. In this example, both workload WL1 and workload WL2 increase, thus consuming additional resources of the on-premises computing environment $190_{T1}$. Meanwhile, the resource demands of workload WL3 and workload WL4 have not increased. One solution to the imbalance is to employ a set of rebalancing operations to cause a swap between WL2 and WL3. Once rebalanced, this results in both the on-premises computing environment $190_{T2}$ as well as the cloud-based computing environment $192_{T2}$ to have substantially the same load. As can be seen from this depiction, workloads are swapped between heterogeneous environments. Accordingly, prior to, during, and after the swap various techniques are applied to manage the acts and effects of rebalancing across heterogeneous environments.

There can be many events that trigger rebalancing. Such an event might trigger examination of workloads within respective heterogeneous environments (step 101). Since the various heterogeneous environments might have differences in their respective resources and/or respective codification of resources and resource usage, a reconciliation of differences is performed (at step 103). Once reconciled, solutions to rebalance between the heterogeneous environments are generated. In accordance with a set of rebalancing acts to implement a particular solution, one or more workloads are moved (at step 105) from one environment to another environment. Various workload rebalancing techniques are shown and described as pertains to the following figures.

Figure 1B:
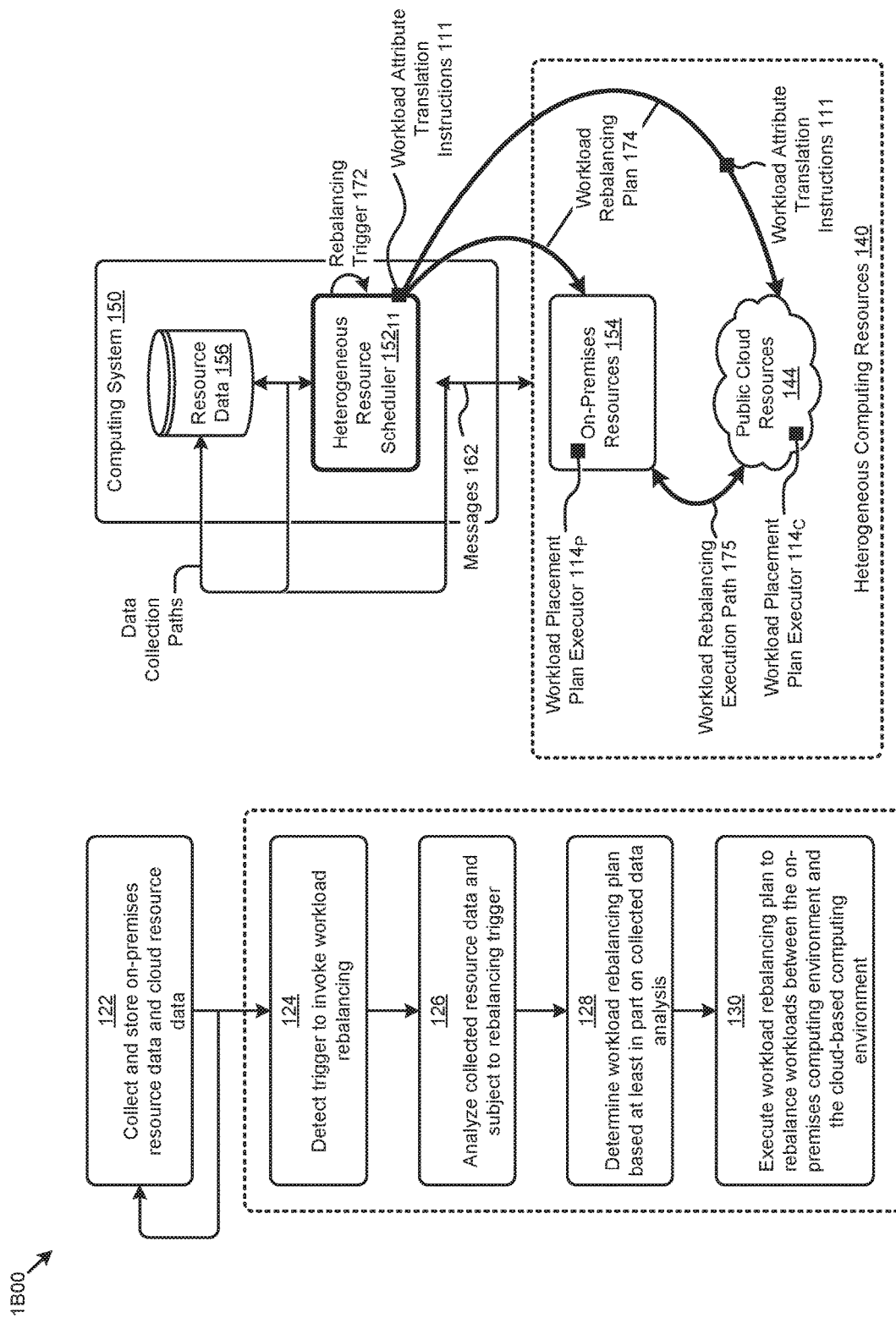
FIG. 1B presents a workload rebalancing technique as implemented in systems for scheduling workloads across highly dynamic heterogeneous resource environments, according to an embodiment.

FIG. 1B presents a workload rebalancing technique 1B00 as implemented in systems for scheduling workloads across highly dynamic heterogeneous resource environments. As an option, one or more variations of workload rebalancing technique 1B00 or any aspect thereof may be implemented in the context of the architecture and functionality of the embodiments described herein. The workload rebalancing technique 1B00 or any aspect thereof may be implemented in any environment.

As shown in the embodiment of FIG. 1B, computing system 150 can access multiple resource environments comprising a set of heterogeneous computing resources 140. A resource environment as disclosed herein is a logically bounded set of resources that facilitate delivery of certain services, functionality, and/or capability. A given resource environment can also be associated with a respective resource provider. For example, and as can be observed, one resource environment in the heterogeneous computing resources 140 comprises a set of on-premises resources 154 provided by the computing system 150. On-premises resources 154 can include storage capabilities, computing capabilities, networking capabilities, and/or other capabilities implemented in computing system 150. In some cases, on-premises resources can be physically bounded in a site, a data center, a cluster, and/or another physical grouping (e.g., node, set of nodes, etc.). The business entity (e.g., enterprise) that owns and/or controls the computing system 150 can be considered the resource provider of the on-premises resources 154.

Another resource environment shown in FIG. 1B comprises a set of public cloud resources 144. Instances of the public cloud resources 144 can facilitate delivery of services by one or more respective cloud service providers. As shown, public cloud resources 144 are external to computing system 150 but can be accessible by the system. In some cases, each cloud service provider has at least one application programming interface (API) that is used to facilitate access to their respective resources. As an example, messages 162 might traverse over such APIs to communicate with the various resource environments. Any of the foregoing resource environments can be characterized by various attributes such as attributes pertaining to resource ownership, configuration, availability, location, security, compliance, cost, rebalancing schedules, and/or other attributes. Resource environments having different attributes can be referred to as heterogeneous. The attributes of such on-premises resources and cloud resources are often highly dynamic. For example, any of the aforementioned attributes, such as configuration or availability, can vary over time (e.g., per hour, per day, etc.). Resource environments other than those depicted in FIG. 1B are possible.

In many cases, the foregoing resource environments avail their resources to resource consumers such as virtualized entities (e.g., virtual machines, containers, etc.) running various workloads. A workload is a set of operations to carry out a certain task or set of tasks. For example, a workload can be implemented at one or more virtualized entities (VEs) to provide SQL server capabilities or map-reduce operations. Each workload, and its corresponding VE or VEs, can use (e.g., consume) various respective levels of resources from the resource environment in which it is implemented. Workload scheduling techniques are implemented to distribute such usage (e.g., consumption) of resources by various workloads so as to maximize or minimize one or more objectives. For example, workloads might be scheduled to use the resources available from the heterogeneous computing resources 140 to maximize availability and/or minimize cost. However, the characteristics of both the on-premises resources and the public cloud resources can be highly dynamic so as to impact the efficacy of an earlier determined workload scheduling plan. For example, the availability, configuration, cost, and/or other characteristics of such resources can vary broadly, both within a given resource environment and across the heterogeneous computing resources 140.

The workload rebalancing technique 1B00 presents one embodiment of certain steps facilitated by the herein disclosed techniques for rebalancing (e.g., workload rebalancing) across highly dynamic heterogeneous resource environments (see workload rebalancing operations 132). As shown, such techniques can be implemented in a heterogeneous resource scheduler $152_{11}$ operating at the computing system 150, according to some embodiments. Specifically, workload rebalancing technique 1B00 can commence (at step 122) with collecting resource data from the on-premises computing system (e.g., the shown on-premises resources 154) and collecting resource data from the cloud resources (e.g., the shown public cloud resources 144). Any known data collection techniques can be used, and any operable data collection paths can be used during the collection of resource data 156.

As indicated in FIG. 1B, collecting resource data can be a continual operation. In certain embodiments, the resource data is requested and received using instances of messages 162 issued according to the API of the respective resource environment or resource. The collected data is stored in a set of resource data 156 at the computing system 150. The resource data are data records that describe various attributes pertaining to a given resource environment or set of resources. The resource data serve to characterize the state at a given moment or period in time of such resource environments or resources. For example, resource data might describe the aforementioned resource environment attributes (e.g., ownership, configuration, availability, location, security, compliance, cost, etc.) and/or resource usage attributes pertaining to a given workload, VE, logical resource group (e.g., environment, cluster, etc.), and/or physical resource group (e.g., geographical site, etc.).

Responsive to collecting certain portions of the resource data, one or more triggering events invoke rebalancing operations (step 124). For example, at least one instance of a rebalancing trigger 172 might be detected at the heterogeneous resource scheduler $152_{11}$ to invoke a rebalancing of the workloads implemented across the heterogeneous computing resources 140. A rebalancing trigger event comprises one or more data elements (e.g., data record, programming variable, programming flag, etc.) that represent a certain resource environment condition or state determined a priori to invoke a rebalancing operation or operations (e.g., workload rebalancing).

For example, a programming flag might be set responsive to detecting a storage input and output (IO or I/O) hotspot at the on-premises resources 154 to "trigger" certain rebalancing operations so as to remediate the hot spot condition. In certain embodiments, the conditions corresponding to the rebalancing triggers can be stored in a set of resource rules. Referring again to FIG. 1B, the detected trigger can invoke an analysis of the earlier collected resource environment data and workload usage data (step 126) to determine a workload rebalancing plan (step 128). A workload rebalancing plan is a set of workload scheduling operations that control where and when the virtualized entities (e.g., VMs, containers, etc.) and associated resources (e.g., memory, storage, etc.) identified for running certain workloads are instantiated, migrated, or removed in order to remediate some detected imbalance. In some cases, the scope of the analysis and data analyzed is based in part on the invoking trigger. As an example, the resource data 156 are analyzed at the heterogeneous resource scheduler $152_{11}$ to calculate a workload rebalancing plan 174.

As can be observed, the workload rebalancing plan 174 involves rebalancing workloads between the on-premises resources 154 and the public cloud resources 144. The workload rebalancing plan 174 can then be deployed to those environments (step 130), and computing resources in each of those environments cooperate to cause migration, movement, and/or to initiate or cause other sorts of rebalancing operations to occur. Communications between the heterogeneous environments can take place using communication over the workload rebalancing execution path 175. In some cases, instances of resource-related messages (e.g., messages 162) can comprise workload scheduling commands, portions of which are sent to constituent computing systems that comprise respective heterogeneous resource environments. The workload rebalancing plan 174 can be executed by a first instance of a workload placement plan executor running at the on-premises resources 154 (e.g., workload placement plan executor $114_P$) or by another instance of a workload placement plan executor running on the public cloud resources 144 (e.g., workload placement plan executor 114$_C$).

In addition to the workload rebalancing plan 174 that is generated by the heterogeneous resource scheduler 152$_{11}$, the heterogeneous resource scheduler or agent sends workload attribute translation instructions 111 to the recipients of the workload rebalancing plan. The workload attribute translation instructions serve to translate the name and meaning of an attribute pertaining to a first environment (e.g., comprising on-premises resources) into a name and meaning of an attribute pertaining to a second environment (e.g., comprising public cloud resources).

Figure 2:
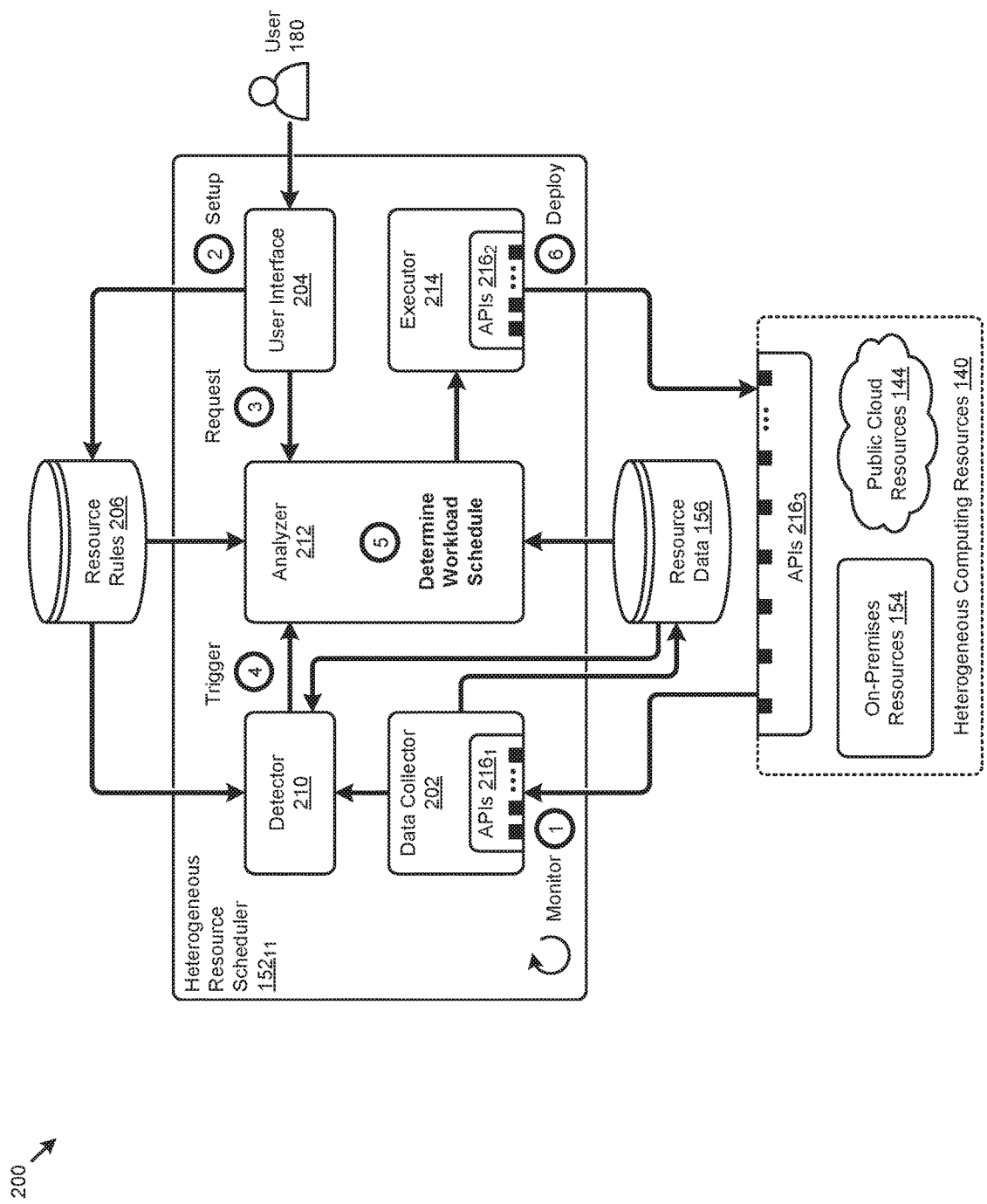
FIG. 2 presents an environment that supports various monitoring and evaluation techniques that are used when scheduling workloads across highly dynamic heterogeneous resource environments, according to an embodiment.

One embodiment of a subsystem and corresponding data flows for implementing the workload rebalancing technique 1B00 and/or other herein disclosed techniques is shown and described as pertaining to FIG. 2.

FIG. 2 presents an environment 200 that supports various monitoring and evaluation techniques that are used when scheduling workloads across highly dynamic heterogeneous resource environments. As an option, one or more variations of environment 200 or any aspect thereof may be implemented in the context of the architecture and functionality of the embodiments described herein. The environment 200 or any aspect thereof may be implemented in any environment.

The embodiment shown in FIG. 2 is merely one implementation of the heterogeneous resource scheduler 152$_{11}$ earlier shown and described as pertaining to FIG. 1. As shown, heterogeneous resource scheduler 152$_{11}$ comprises a data collector 202 to continually monitor the resources (e.g., on-premises resources 154 and public cloud resources 144) of the heterogeneous computing resources 140 (operation 1). Communication between the data collector 202 and the heterogeneous computing resources 140 is facilitated by a set of APIs 216$_1$ at data collector 202 and a corresponding set of APIs 216$_3$ at the heterogeneous computing resources 140. All or some of the collected resource data is stored in the resource data 156.

A user interface 204 facilitates various interactions between the heterogeneous resource scheduler 152$_{11}$ and one or more users (e.g., user 180). The user interface can facilitate certain setup operations to be performed by user 180 (operation 2). For example, user 180 (e.g., system administrator) might interact with the user interface 204 to establish various instances of the resource rules 206 used by the herein disclosed techniques according to certain embodiments. Such resource rules might be specified manually, and/or based at least in part on heuristics, and/or such rules might be learned and emitted by one or more machine learning modules. Machine learning modules might be implemented as neural networks, and/or as support vector machines, and/or as classifiers, and/or using any known supervised or unsupervised machine learning techniques. The observations made during machine learning might include seed observations and/or ongoing observations of human-assisted rebalancing, and might correlate a time series of actions of such human-assisted rebalancing to a time series of one or more triggers.

As such, resource rules, whether codified manually or whether emitted by a machine learning module might pertain to certain respective triggers (e.g., workload rebalancing triggers), service level agreements (SLAs), security and/or compliance policies, and/or other subjects. User interface 204 can further facilitate workload placement requests issued by user 180 to an analyzer 212 at heterogeneous resource scheduler 152$_{11}$ (operation 3). Analyzer 212 also receives workload rebalancing triggers issued by a detector module at the heterogeneous resource scheduler 152$_{11}$ (operation 4). The workload rebalancing triggers issued by the detector 210 are based in part on the resource data from the data collector 202 and, in some cases, the resource rules 206. The resource data 156 can comprise historical data, such as sets of time series observations of usage pertaining to measured resource usage or measured resource configuration data. In some cases, the detector 210 uses historical data to process resource rules.

Responsive to the workload placement requests from user interface 204 and/or the workload rebalancing triggers from detector 210, analyzer 212 determines a workload scheduling plan (operation 5). The analyzer 212 can use the resource data 156 and/or the resource rules 206 to determine the plan. When a workload placement request is issued, the workload scheduling plan determined at the analyzer 212 includes placement of the workloads specified in the request. When a workload rebalancing trigger is issued, the workload scheduling plan determined at the analyzer 212 can include a rebalancing of workloads in response to the condition (e.g., resource usage imbalance) associated with the trigger. In some cases, the workload scheduling plan can be determined based at least in part on one or more objectives specified in the workload placement request or earlier specified in the resource rules 206. A workload placement plan executor (e.g., the shown executor 214) can deploy the workload scheduling plan (operation 6) to the heterogeneous computing resources 140. Communication between the executor 214 and the heterogeneous computing resources 140 is facilitated by a set of APIs 216$_2$ at executor 214 and corresponding set of APIs 216$_3$ at the heterogeneous computing resources 140.

The components and data flows shown in FIG. 2 present merely one partitioning and associated data manipulation approach. The specific example shown is purely exemplary, and other subsystems and/or partitionings are reasonable. Further details describing the aforementioned monitoring operations and/or subsystems, and/or partitionings are shown and described as pertaining to FIG. 3.

Figure 3:
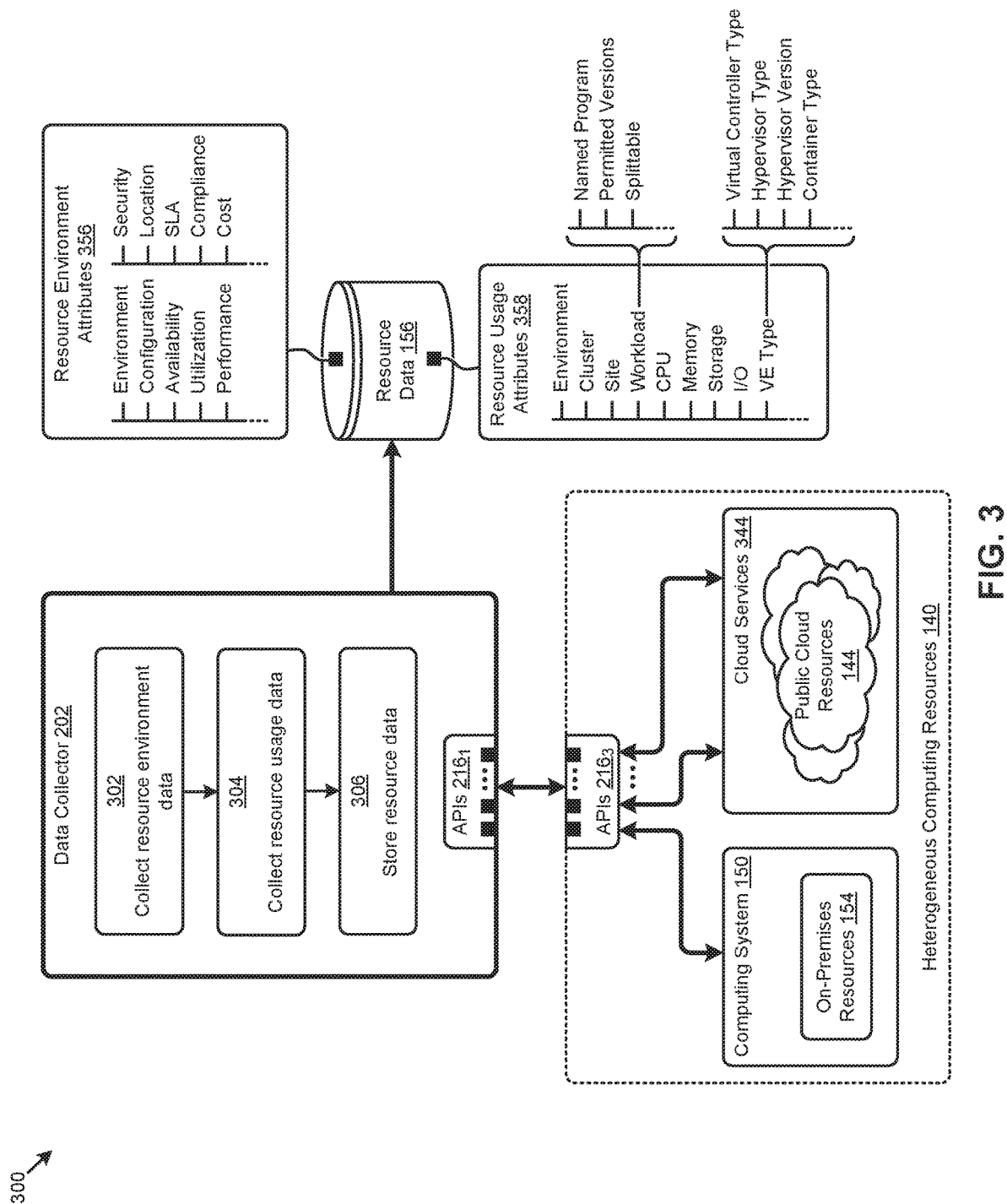
FIG. 3 presents a heterogeneous environment monitoring technique as implemented in systems for scheduling workloads across highly dynamic heterogeneous resource environments, according to an embodiment.

FIG. 3 presents a heterogeneous environment monitoring technique 300 as implemented in systems for scheduling workloads across highly dynamic heterogeneous resource environments. As an option, one or more variations of heterogeneous environment monitoring technique 300 or any aspect thereof may be implemented in the context of the architecture and functionality of the embodiments described herein. The heterogeneous environment monitoring technique 300 or any aspect thereof may be implemented in any environment.

The data collector 202 earlier described is shown in FIG. 3 interacting with the heterogeneous computing resources 140 to collect resource data to facilitate scheduling of the resources comprising the heterogeneous computing resources 140. In certain embodiments, data collector 202 can use multiple APIs (e.g., APIs 216$_1$ and APIs 216$_3$) provided by respective instances of the computing system 150 and the cloud services 344 comprising the on-premises resources 154 and the public cloud resources 144, respectively, of the heterogeneous computing resources 140.

One embodiment of certain steps facilitated by the data collector 202 for collecting the resource environment data can commence with collecting resource data pertaining to the resource environments (step 302). The resource environment data comprise data records that describe various attributes pertaining to a given resource environment.

The resource environment data are computer-readable data items that characterize the state of such resource environments at a given moment or period in time. For example, and as shown in resource environment attributes 356, resource environment data might describe for a given environment an "Environment" identifier, a resource "Configuration", a resource "Availability", a resource "Utilization", a resource "Performance", a "Security" policy, a resource "Location", an "SLA", a "Compliance" policy, a resource usage "Cost", and/or other attributes. The resource environment data are often organized and/or stored in a tabular structure (e.g., relational database table) having rows corresponding to a certain resource environment and columns corresponding to resource environment attributes or attribute elements associated with the resource environment.

For example, an "Availability" attribute for a given environment might be represented as a row in a table having a hardware element column named "node" and an availability start element column named "start" with respective row entries of "node789" and "09/01/2016". The resource environment data can also be organized and/or stored in key-value pairs, where the key is the resource environment attribute or element of the attribute, and the value is the data element (e.g., number, character string, array, etc.) associated with the attribute or attribute element. Other examples of resource environment data might describe resource sizing, such as number and clock speed of CPUs, memory capacity (e.g., in GB), storage size (e.g., in GB, TB, or IOPS), and/or other sizing attributes. Resource environment data might further describe node characteristics (e.g., CPU type, storage type, etc.), network topologies, cloud service pricing (e.g., spot instance pricing, reserved instance pricing, on-demand instance pricing, etc.), type of cloud instances available, and/or other resource environment attributes.

The data collector 202 also collects resource usage data from the resource environments (step 304). The resource usage data comprise data records that describe various attributes pertaining to the resources used by a given workload or in aggregate by the workloads in a given resource environment. The resource usage data serve to characterize the level of resources consumed by a given workload, or the state of the resource utilization of the resource environments at a given moment or period in time.

For example, and as shown in resource usage attributes 358, resource usage data might describe various resource usage attributes for a given "Environment", "Cluster", "Site", "Workload", and/or another resource provider or consumer. Specifically, for any of the foregoing resource providers or consumers, the resource usage data might describe an associated "VE type", a "CPU" usage, a "Memory" usage, a "Storage" usage, an "I/O" usage, and/or other usage attributes. The resource usage data are often organized and/or stored in a tabular structure (e.g., relational database table) having rows corresponding to a certain resource provider or consumer, and columns corresponding to resource usage attributes or attribute elements associated with the resource provider or consumer. For example, a row corresponding to a workload "vdi" might have a VE type column named "veType" and a memory usage column named "mem" with respective row entries of "type03" and "20 GB". Other examples of resource usage data might describe VM attributes such as CPU type and/or storage type (e.g., SSD, HDD, etc.). Examples of resource usage data might also describe certain attributes of a given workload (e.g., application) such as the set of VMs associated with the workload, the network connection and data flow between the VMs (e.g., NAT rules, open ports network connections, network bandwidth requirements, Internet traffic restrictions, etc.), the workload data characteristic (e.g., number of reads and writes, change in data over time, etc.), security policy (e.g., production security, development security, encryption, etc.), and/or other workload attributes, including named workloads such as "SQL Workload", "Exchange Workload", "Sharepoint Workload", etc., any of which can be associated with one or more "veType" values. A given workload might be characterized by still additional attributes. As shown, a workload might be described as having an association to a particular named program (e.g., a "Named Program"), and/or a set of permitted versions thereto (e.g., "Permitted Versions"), and/or an indication to characterize if and how a particular workload or named program could be split across heterogeneous environments.

The set of resource usage attributes 358 might comprise characteristics or attributes pertaining to the virtual entity type. As shown, "VE Type" might be characterized as being a controller virtual machine (CVM) or a user VM, and/or as being configured for a particular hypervisor type or version, and/or as being configured or deliverable as an executable container or a particular type (e.g., a Docker container).

Referring again to the heterogeneous environment monitoring technique 300 in FIG. 3, the foregoing resource data collected from the heterogeneous computing resources 140 is stored in a storage facility, such as resource data 156 (step 306). Resource data 156 is a data store such as an SQL database or a NoSQL data fabric. Some of the resource data, such as the resource environment data, are collected periodically (e.g., one sample per hour) and the resulting time-series of data is stored for access in resource data 156. Other data, such as the resource usage data (e.g., VM characteristics), are collected in real-time based at least in part on a periodic collection schedule or upon request.

Further details describing the aforementioned workload placement request operation is shown and described as pertaining to the following figures.

Figure 4A:
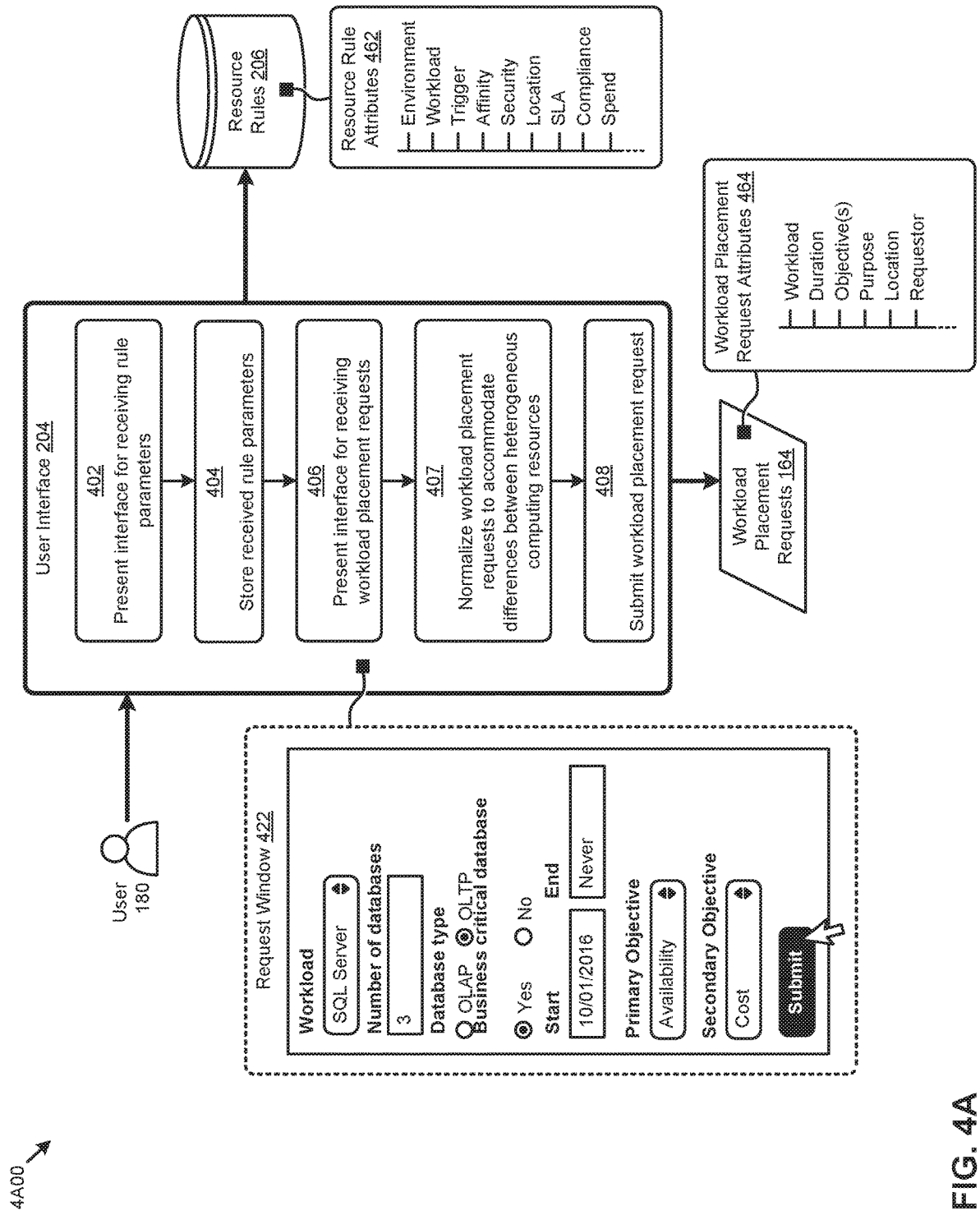
FIG. 4A depicts a workload placement request technique as implemented in systems for scheduling workloads across highly dynamic heterogeneous resource environments, according to an embodiment.

FIG. 4A depicts a workload placement request technique 4A00 as implemented in systems for scheduling workloads across highly dynamic heterogeneous resource environments. As an option, one or more variations of workload placement request technique 4A00 or any aspect thereof may be implemented in the context of the architecture and functionality of the embodiments described herein. The workload placement request technique 4A00 or any aspect thereof may be implemented in any environment.

The user interface 204 earlier described is shown in FIG. 4A. User interface 204 is one embodiment of a facility that a user (e.g., user 180) can use to perform various operations pertaining to scheduling workloads across highly dynamic heterogeneous resource environments. Specifically, user interface 204 can facilitate the specification and storage of resource rules 206. Further, user interface 204 can facilitate creation and submission of various instances of workload placement requests 164. Other operations supported by user interface 204 are possible.

The workload placement request technique 4A00 depicts one embodiment of certain steps facilitated by the user interface 204 performing the foregoing operations. Workload placement request technique 4A00 can commence with presenting an interface to user 180 for receiving rule parameters (step 402). Such an interface often comprises one or more view windows presented to the user on a screen or monitor and having various components (e.g., text boxes, dropdown selectors, buttons, etc.) for capturing user inputs. As an example, the interface might be a web page rendered by a browser application. User 180 can use such a view window to specify (e.g., enter, select, etc.) one or more rule parameters describing a set of associated resource rules. The user interface 204 can also invoke storage of the received rule parameters in a storage facility such as the shown resource rules 206 (step 404). For example, clicking a "Submit" button after specifying the resource rule parameters can invoke storage of the parameters.

The resource rules are resource rule parameters comprised of a set of data records that describe constraints pertaining to various aspects of the resources across the heterogeneous resource environments. As shown in the representative instance of resource rule attributes 462, the constraints might pertain to such aspects as a resource environment ("Environment"), a workload ("Workload"), a resource usage or resource configuration trigger ("Trigger"), a resource affinity (e.g., a VM "Affinity"), a resource security policy ("Security"), a resource location ("Location"), a resource service level agreement ("SLA"), a regulation compliance value ("Compliance"), an enterprise resource spending amount ("Spend") or fiscal budget, and/or other aspects. The resource rules are often organized and/or stored in a tabular structure (e.g., relational database table) having rows corresponding to a rule scope (e.g., environment, workload, etc.) and columns corresponding to resource rule attributes, resource rule constraints, and/or other rule attribute elements associated with the semantics of and/or application of a corresponding rule.

For example, a rule constraining placement of an SQL server workload to an on-premises resource environment might be represented as a row in a table having a column named "workload" and another column name "environment" with respective row entries of "sql" and "onprem". The resource rules can also be organized and/or stored in key-value pairs, where the key is the resource rule attribute or element of the attribute, and the value is the data element (e.g., number, character string, array, etc.) associated with the attribute or attribute element. In some cases, resource rule attributes or attribute elements can describe relationships between resource rule parameters. For example, a "Trigger" attribute might comprise elements "fops", ">", and "35000" that are interpreted to invoke a trigger when an IOPS measurement for a particular group of resources exceeds 35000. Further details related to triggers is shown and described as pertaining to FIG. 5.

Referring again to the workload placement request technique 4A00 in FIG. 4A, an interface for receiving workload placement requests can also be presented at user interface 204 (step 406). Specifically, as an example, request window 422 might be presented to user 180 for specifying a workload placement request. As shown, request window 422 presents a dropdown selector for specifying a workload (e.g., "SQL Server") and various characteristics for that workload. Request window 422 also presents input elements to specify the duration (e.g., "Start" and "End" times) the workload is planned to run. Further, a "Primary Objective" and "Secondary Objective" to apply to selecting a placement plan for the workload can be selected in request window 422. At step 407, workload placement requests are normalized to accommodate differences between heterogeneous computing resources. For example, an on-premises computing system might characterize a "logical block" that is 512 bytes in size, whereas a cloud computing system might characterize its logical block size as being 1024 bytes. Any known techniques can be applied to be able to reconcile attributes such that comparisons and other analysis can be performed with consistency even when the system attribute derive from heterogeneous sources.

The user 180 can generate an event (e.g., in the form of a workload placement request) to initiate workload placement planning by clicking a "Submit" button to submit the request (step 408). The resulting instance of workload placement request 164 will comprise the example attributes depicted in request window 422, but such workload placement requests can comprise other attributes as well. As shown in the representative attributes in workload placement request attributes 464, attributes in addition to the aforementioned "Workload", "Duration", and "Objective(s)" attributes can include a request "Purpose", a request "Location" (e.g., of requestor, of target placement, etc.), a set of "Requestor" information, and/or other attributes. The parameters and/or attributes associated with a given workload placement request are often organized in a structured data interchange format such as JSON or XML, to facilitate transfer of the request to analyzer 212.

In one example use case facilitated by the workload placement request technique 4A00, an enterprise X has subscribed to certain services from a cloud service provider that can be used by various users and administrators (e.g., user 180) from enterprise X. User 180 can invoke the user interface 204, which might present the service provider portal to request instantiation of a workload such as an application or application extension, or app, etc. that is selected from a catalog or online repository. For example, the application can comprise one VM instantiated from a base operating system (OS) image in the service catalog. In some cases, the application images in the service catalog can have pre-defined attributes or characteristics. These application attributes may be defined by an administrator from enterprise X, or defined by the cloud service provider (e.g., in the case of base OS images). Such attributes can comprise any of the earlier described workload placement request attributes such as the geo-location of the requestor, the duration the application is expected to run, or the intended application purpose (e.g., production, development, test, etc.). When the parameters pertaining to the application request are entered and/or selected, user 180 can submit the workload placement request from the user interface 204.

Figure 4B:
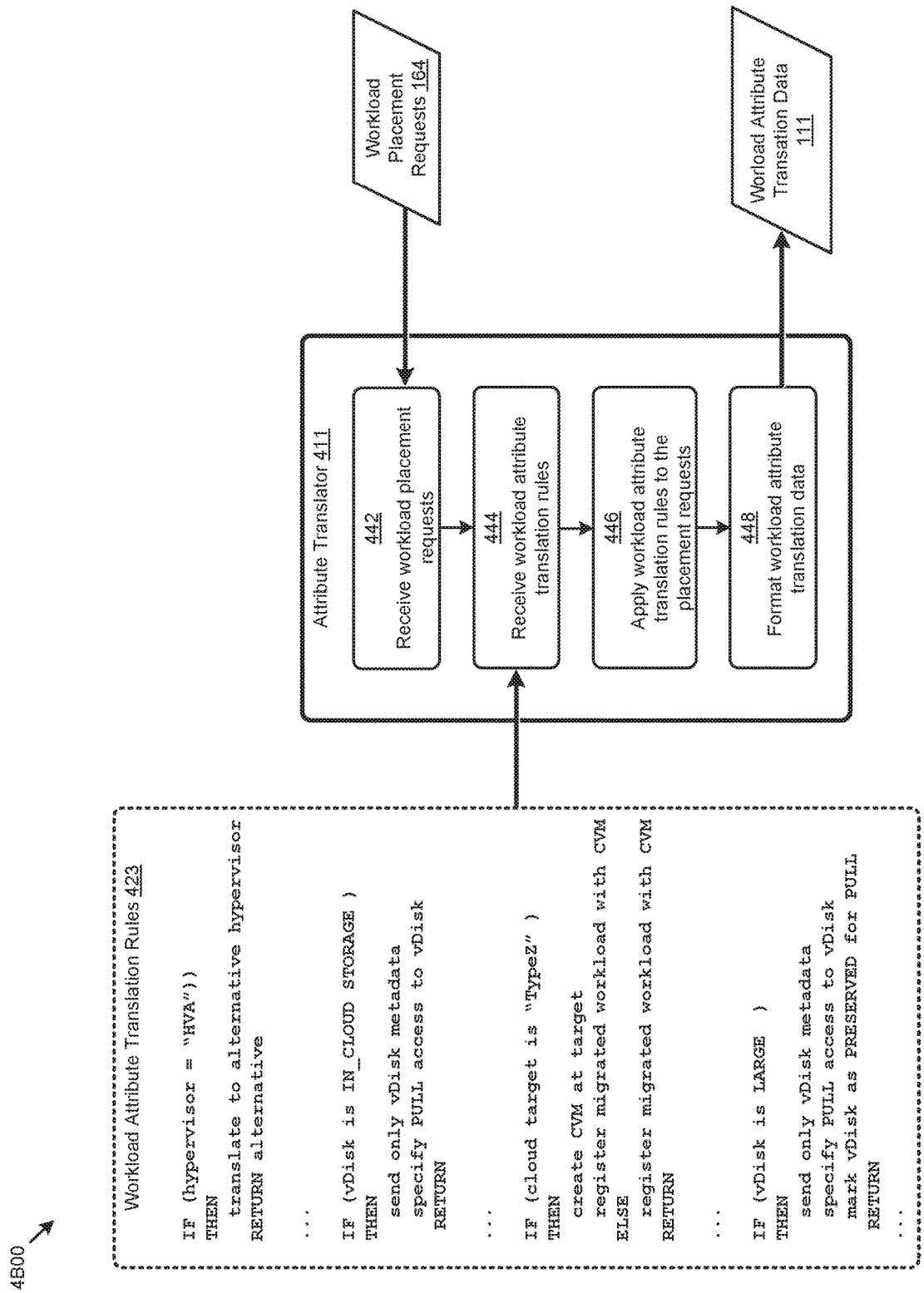
FIG. 4B depicts a workload placement attribute translation technique as implemented in systems for scheduling workloads across highly dynamic heterogeneous resource environments, according to an embodiment.

FIG. 4B depicts a workload placement attribute translation technique 4B00 as implemented in systems for scheduling workloads across highly dynamic heterogeneous resource environments. As an option, one or more variations of workload placement attribute translation technique 4B00 or any aspect thereof may be implemented in the context of the architecture and functionality of the embodiments described herein. The workload placement attribute translation technique 4B00 or any aspect thereof may be implemented in any environment.

In some situations, the cloud-based environment and the on-premises environment support the same or similar computing equipment. However, in many other situations the cloud-based environment and the on-premises environment are composed of very different computing equipment and/or are configured with differing software. As such, a workload placement attribute translation might need to occur when processing workload placement requests. As shown, an attribute translator 411 might receive workload placements requests (step 442), and might also receive a set of workload attribute translation rules (step 444). The attribute translator 411 might then process the received workload placements requests in accordance with the rules (step 446).

Strictly as examples, the set of workload attribute translation rules 423 might comprise rules pertaining to hypervisors, virtual disks, CVMs, etc. As shown, one rule pertains to establishing a CVM to execute within a cloud-based environment. More specifically, if a workload placement request indicates that a cloud-based target is, for example, "TypeZ", then steps are taken to create a CVM that is configured to execute in the cloud resources at the cloud-based target. The workload placement request might be augmented to create the CVM and to then explicitly register the workload with the newly-established CVM.

Alternatively, if it is deemed that the target cloud-based environment already has a CVM situated at a target node, then the placement request might not need to be augmented to create a CVM, and might instead just register a migrated workload with the pre-existing CVM.

In some cases, the placement request or group of placement requests might be augmented with workload attribute translation instructions and any supporting workload attribute translation data, which can be consumed at the target so as to translate the name and meaning of an attribute pertaining to a first environment (e.g., a source environment) into a name and meaning of an attribute pertaining to a second environment (e.g., a target environment).

When the applicable workload attribute translation rules have been applied, the workload attribute translation instructions and data can be formatted (step 448) so as to comport with any receiver at the target environment.

In addition to the example rules given in the shown set of workload attribute translation rules 423, workload attribute translation rules might also include rules that pertain to translating virtual disks (e.g., virtual disk data, virtual disk metadata, etc.) into formats (e.g., cloud-based storage objects) that comport with any receivers or usage models at the target environment.

In some cases, the workload attribute translation instructions and data include binary data (e.g., a binary image of a controller virtual machine) as well as installation and configuration specifications pertaining to the binary data (e.g., installation specifications or installation instructions and configuration data pertaining to a controller virtual machine).

In addition to workload placement requests, other events can also invoke various workload and/or other scheduling operations according to the herein disclosed techniques. Some events can correspond to one or more workload rebalancing triggers as shown and described as pertaining to FIG. 5.

Figure 5:
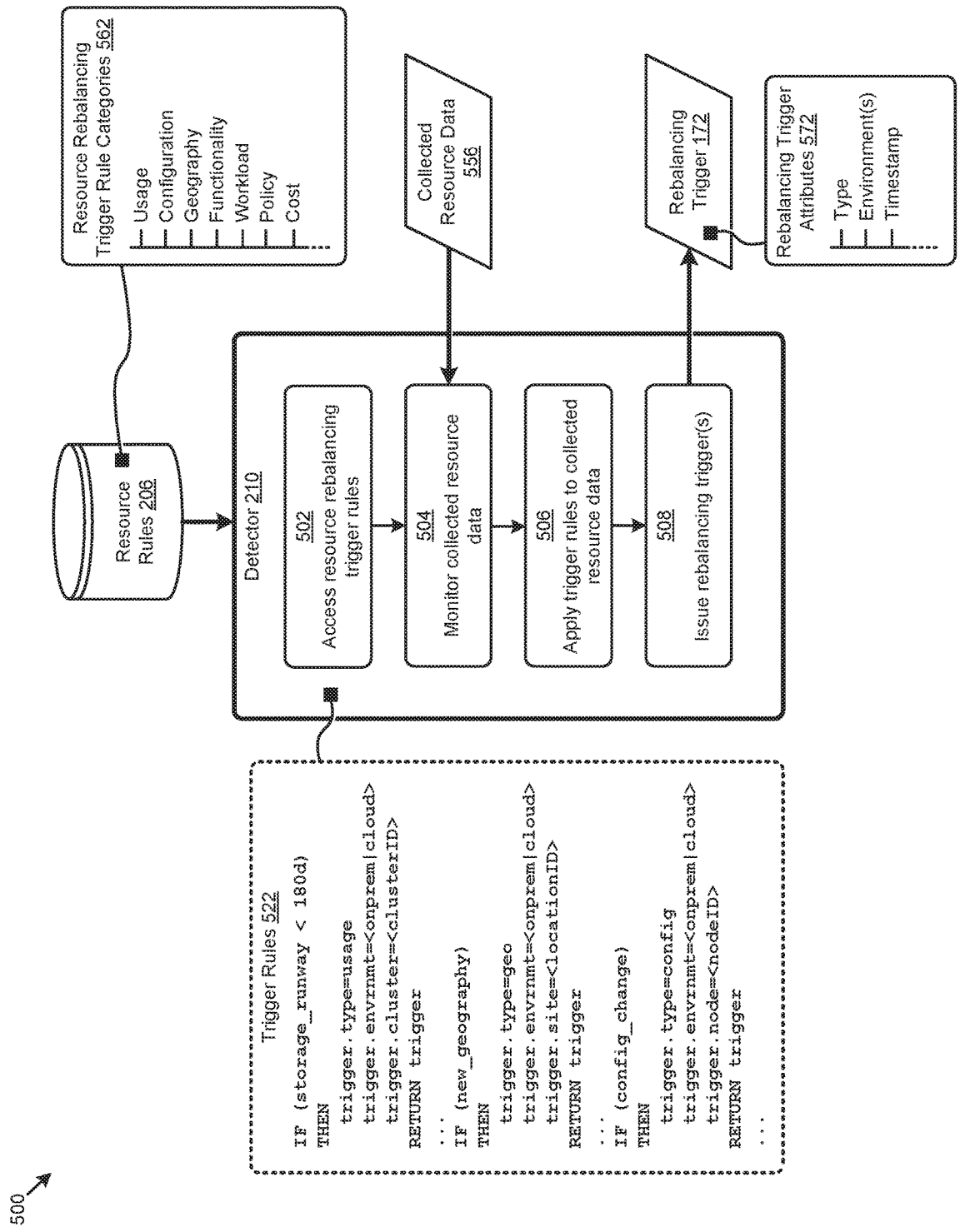
FIG. 5 illustrates a triggering technique that facilitates periodic workload rebalancing across computing infrastructure in heterogeneous resource environments, according to an embodiment.

FIG. 5 illustrates a triggering technique 500 that facilitates periodic workload rebalancing across computing infrastructure in heterogeneous resource environments. As an option, one or more variations of triggering technique 500 or any aspect thereof may be implemented in the context of the architecture and functionality of the embodiments described herein. The triggering technique 500 or any aspect thereof may be implemented in any environment.

The triggering technique 500 depicts one embodiment of certain steps facilitated by the detector 210 for generating rebalancing triggers (e.g., rebalancing trigger 172) based in part on collected resource data 556 and resource rules 206. Specifically, triggering technique 500 can commence with accessing various rebalancing trigger rules at resource rules 206 (step 502). The rebalancing trigger rules comprise a set of data records that describe criteria used to invoke or not invoke a given workload rebalancing event. The data records can comprise numerical values, character strings, and/or other data objects interpreted as constraints, limits, thresholds, algebraic relationships, logical relationships, and/or another entity.

As shown in the representative instance of rebalancing trigger rule categories 562, the rebalancing trigger rules might pertain to a resource "Usage", a resource configuration (e.g., "Configuration"), a resource geography (e.g., "Geography"), a resource functionality (e.g., "Functionality"), a "Workload", a "Policy" (e.g., security policy, data retention policy, etc.), a resource usage cost (e.g., usage "Cost"), and/or other categories. Representative examples of such rebalancing trigger rules are depicted in the pseudo-code of trigger rules 522. Specifically, three trigger categories are shown: "usage", geography or "geo", and configuration or "config". As can be observed, each trigger rule comprises a condition and a trigger object that is created when the respective condition or criteria is satisfied. For example, when the storage usage runway is less than 180 days (e.g., storage_runway<180 d), a trigger object is created identifying the trigger type (e.g., type=usage), the associated environment (e.g., envrnmt=onprem), as well as the cluster having the storage usage issue. Other example triggers shown in trigger rules 522 are created based at least in part on true or false conditions determined by detected geographical resource additions (e.g., new_geography) or detected configuration changes (e.g., config_change).

The detector 210 can also monitor collected resource data (step 504). In certain embodiments, such resource data is collected by the data collector 202 shown and described as pertaining to FIG. 2 and FIG. 3. The rebalancing trigger rules are applied to the collected resource data (step 506) to determine one or more rebalancing triggers to be emitted by detector 210 (step 508). For example, the storage runway threshold of 180 days illustrated in trigger rules 522 can be applied to the storage resource usage data from the collected resource data 556 to determine any set or sets of resources that breach a particular usage trigger threshold. As shown in rebalancing trigger attributes 572, the resulting rebalancing triggers (e.g., rebalancing trigger 172) issued can comprise the example attributes (e.g., "Type", "Environment", etc.) depicted in trigger rules 522, but such rebalancing triggers can comprise other attributes, such as a "Timestamp". The parameters and/or attributes associated with a given rebalancing trigger are often organized in a structured data-interchange format such as JSON or XML to facilitate communication and presentation of the request. An example scenario involving communication and presentation of parameters and/or attributes associated with a rebalancing trigger is shown and described as pertaining to FIG. 6A.

Figure 6A:
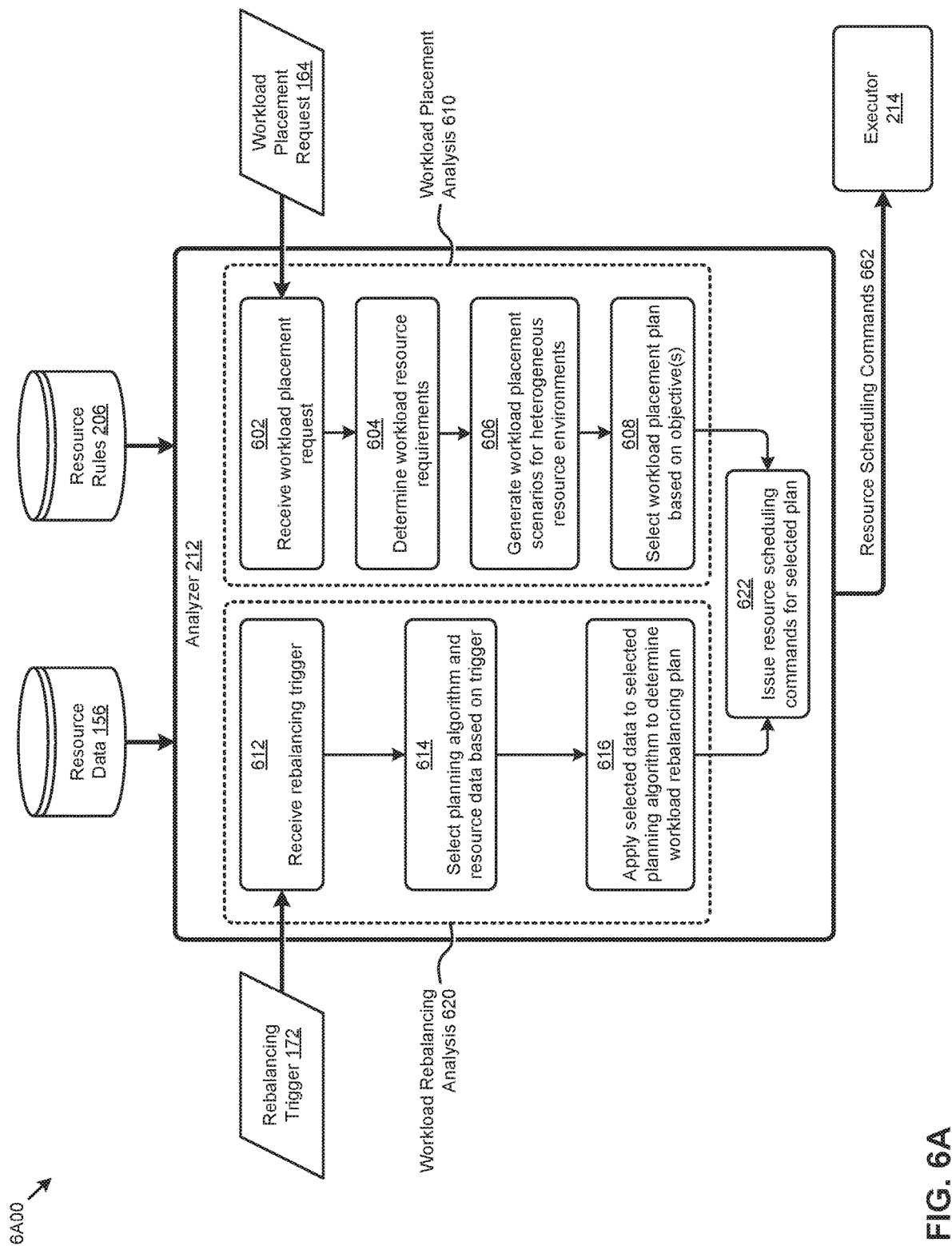
FIG. 6A presents a workload planning technique as implemented in systems for scheduling workloads across highly dynamic heterogeneous resource environments, according to an embodiment.

FIG. 6A presents a workload planning technique 6A00 as implemented in systems for scheduling workloads across highly dynamic heterogeneous resource environments. As an option, one or more variations of workload planning technique 6A00 or any aspect thereof may be implemented in the context of the architecture and functionality of the embodiments described herein. The workload planning technique 6A00 or any aspect thereof may be implemented in any environment.

The embodiment of the analyzer 212 shown in FIG. 6A serves to provide a workload placement analysis 610 and/or a workload rebalancing analysis 620 to facilitate the herein disclosed techniques for scheduling workloads across highly dynamic heterogeneous resource environments. Specifically, to perform a workload placement analysis 610, analyzer 212 can receive one or more instances of a workload placement request 164 (step 602). Using the parameters provided in the workload placement request and/or other information, analyzer 212 can determine the resource requirements pertaining to the workloads associated with the request (step 604). Such requirements, for example, can be specified by an administrator and/or observed from operating instances of the workloads. Such information can be accessed from the resource data 156 and/or the resource rules 206 by analyzer 212.

Next, a set of workload placement scenarios across heterogeneous resource environments can be generated by analyzer 212 (step 606). The workload placement scenarios can be generated so as to satisfy any constraints that might be specified in the workload placement request and/or the resource rules 206. In some embodiments, during generation of workload placement scenarios, the analyzer can implement all or portions of a constraint satisfaction algorithm. Such algorithms can be invoked based at least in part on any combinations of manually-specified trigger rules and/or threshold-sensitive rules.

One or more objectives (e.g., availability, cost, time, etc.) can be applied to the scenarios to facilitate selection of a workload placement plan for deployment (step 608). Such objectives can be specified in the workload placement request 164 and/or in the resource rules 206. Various algorithms can be used to generate the workload placement scenarios and/or to select a particular candidate workload placement plan. For example, a logistic regression algorithm might be used to determine a likelihood of success and/or a probability of suitability (e.g., according to one or more quantitative objectives) of placing the workload in an on-premises resource environment. A probability of greater than 50% indicates the workload should be placed in the on-premises resource environment. A probability of less than 50% would indicate the workload should be placed in a public cloud resource environment. Other multi-objective optimization algorithms are possible. Strictly as one example, a multi-objective optimization approach might be based at least in part on resource scarcity or other penalty such as costs. One particular multi-objective optimization approach computes the resource cost of running a portion of the workload using on-premises resources and running the remaining portions of the workload in a cloud-based computing environment. Various heuristics, resource rules, and/or workload characteristics such as network communication availability and costs between the on-premises settings and cloud-based settings can be considered in any multi-objective optimization approach. As such, the workload can be "split" to achieve an optimal split or at least a lowered cost split so as to reduce aggregate resource costs.

Analyzer 212 can also commence a workload rebalancing analysis 620 by receiving one or more instances of a rebalancing trigger 172 (step 612). Using the parameters provided in the rebalancing trigger and/or other information, analyzer 212 can select a planning algorithm and portion of the resource data 156 to be analyzed (step 614). The selected resource data can then be analyzed using the selected planning algorithm to determine a workload rebalancing plan (step 616). In some cases, for example, the algorithm and portion of resource data might be selected so as to minimize the time to perform the analysis. As an example, a trigger indicating that a new node has been added to a given cluster might merely perform an analysis of the workloads pertaining to, for example, an affinity group. The analysis might result in moving the top resource-consuming workloads and/or constituents of a corresponding affinity group to the new node. In other cases, such as when a new cloud resource site is available, a larger corpus of data and a more complex algorithm might be selected.

A set of workload scheduling commands can be issued by the analyzer 212 corresponding to the workload placement plan that has been determined from the workload placement analysis (at step 622), or the workload rebalancing plan that has been determined from the workload rebalancing analysis. According to the embodiment shown in FIG. 6A, scheduling commands (e.g., scheduling commands 662) are issued to the executor 214 for deployment to the target resource environments.

Specifically, based at least in part on the workload placement or rebalancing plan, a workload placement plan executor (e.g., executor 214) makes API calls to the on-premises resource environment and the public cloud resource environment to create new VMs, configure the environment (e.g., network connections, permissions, etc.), copy data, and/or perform other operations to run the workloads. In some cases, the user is notified as to the scheduling status, such as when the workload (e.g., application) is ready for use, which may be several minutes from the time the request or rebalancing trigger is initiated to the time the data has completed being transferred across the network between an on-premises resource environment to a public cloud resources environment.

In certain embodiments, scheduling execution modules use an extensible framework to which new plugins can be added. Such plugins describe source or target resource environments. For example, an Amazon Web Service (AWS) plugin will provide AWS end-point URLs, a link to a pricing page, and a list of APIs required for execution (e.g., runInstance, setPublicIP, etc.). Another set of plugins can be used for conversion of VM instances and/or data between the different formats (e.g., VMWare VMDK, AWS AMI, etc.) of the heterogeneous resource environments.

Figure 6B:
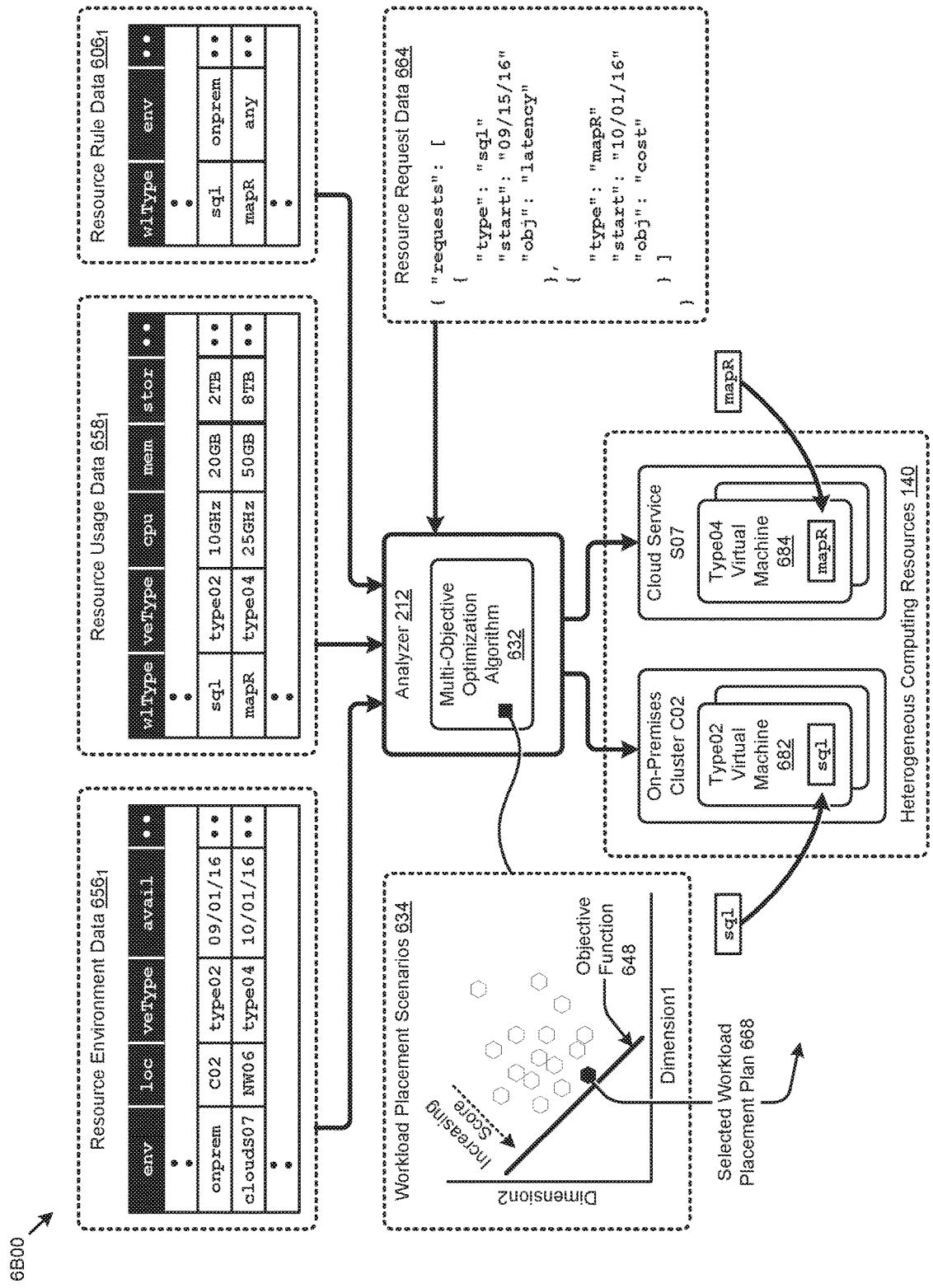
FIG. 6B illustrates a workload placement plan selection technique as implemented by systems that schedule resources across highly dynamic heterogeneous resource environments, according to an embodiment.

An example workload placement plan selection facilitated in part by analyzer 212 is shown and described as pertaining FIG. 6B.

FIG. 6B illustrates a workload placement plan selection technique 6B00 as implemented by systems that schedule resources across highly dynamic heterogeneous resource environments. As an option, one or more variations of workload placement plan selection technique 6B00 or any aspect thereof may be implemented in the context of the architecture and functionality of the embodiments described herein. The workload placement plan selection technique 6B00 or any aspect thereof may be implemented in any environment.

FIG. 6B illustrates merely one example of the data and data structures exposed to analyzer 212 for selecting a workload placement plan (e.g., selected workload placement plan 668) according to the herein disclosed techniques. Specifically, workload placement plan selection technique 6B00 depicts example tabular representations of examples of resource environment data $656_1$, resource usage data $658_1$, and resource rule data $606_1$ received by analyzer 212. Further shown is a structured data-interchange format representation of examples of resource request data 664 received by analyzer 212. Resource environment data $656_1$ indicates that a "type02" virtualized entity (e.g., VM) is available from "09/01/16" at cluster "C02" in an on-premises (e.g., "onprem") resource environment. Resource environment data $656_1$ also indicates that a "type04" virtualized entity (e.g., VM) is available from "10/01/16" at site "NW06" of cloud service provider "cloudS07". Resource usage data $658_1$ indicates an SQL server workload (e.g., "sql") requires a "type02" VM, consumes at a "10 GHz" CPU rate, and needs "20 GB" of memory and "2 TB" of storage. Resource usage data $658_1$ also indicates a mapreduce workload (e.g., "mapR") requires a "type04" VM, consumes at a "25 GHz" CPU rate, and needs "50 GB" of memory and "8 TB" of storage. Further, resource rule data $606_1$ indicates that SQL server workloads can run on on-premises (e.g., "onprem") resources, while map-reduce workloads can run in "any" resource environment. The resource request data 664 indicates a request to place an SQL server workload (e.g., "sql") with a start date of "09/15/16" and a placement objective of minimum "latency". The resource request data 664 also indicates a request to place a map-reduce workload (e.g., "mapR") with a start date of "10/01/16" and a placement objective of minimum "cost".

As can be observed, the foregoing data is received by a multi-objective optimization algorithm 632 at analyzer 212 to determine a selected workload placement plan 668 for the workloads specified in resource request data 664. As an example, the algorithm might generate various instances of workload placement scenarios 634. In some cases, the workload placement scenarios 634 are based at least in part on combinations of feasible placement options for the specified workloads given any constraints from the received data. For example, the foregoing data constrains the "sql" workload to an "onprem" environment (see resource rule data 606$_1$) and a "type02" VM (see resource usage data 658$_1$) to be available by "09/15/16" or earlier (see resource request data 664). To facilitate comparison of the generated scenarios, one or more workload placement scenario metrics can be determined for the scenarios to plot them in a common objective space. For example, and as shown, cost metrics and latency metrics corresponding to the objectives specified in resource request data 664 can be determined for each respective instance of the workload placement scenarios 634 in order to plot them in an objective space defined by a cost dimension and a latency dimension. Any number of other objectives are possible.

An objective function relating the objectives to multiple dimensions (e.g., cost and latency) in the objective space can be used to determine scenario scores for the workload placement scenarios 634. As an example, the objective function 648 might have a slope of one indicating that cost and latency are equally weighted. Other slopes, polynomial orders, and/or other characteristics pertaining to the objective function are possible. As shown, higher (or lower) scores might correspond to scenarios having increasingly lower (e.g., minimized) cost and latency metrics. In other cases, higher (or lower) scores might correspond to maximizing certain objectives (e.g., availability). The scores can then be used to select the selected workload placement plan 668 from the workload placement scenarios 634.

Specifically, as illustrated in FIG. 6B, the selected workload placement plan 668 places the "sql" workload in a type02 virtual machine 682 in an on-premises cluster C02 in the heterogeneous computing resources 140. The selected workload placement plan 668 also places the "mapR" workload in a type04 virtual machine 684 at the cloud service S07 in the resource environments.

In some cases, resource or workload rebalancing is automatically triggered. An example of such a workload rebalancing plan selection according to the herein disclosed techniques is shown and described as pertaining to FIG. 6C.

Figure 6C:
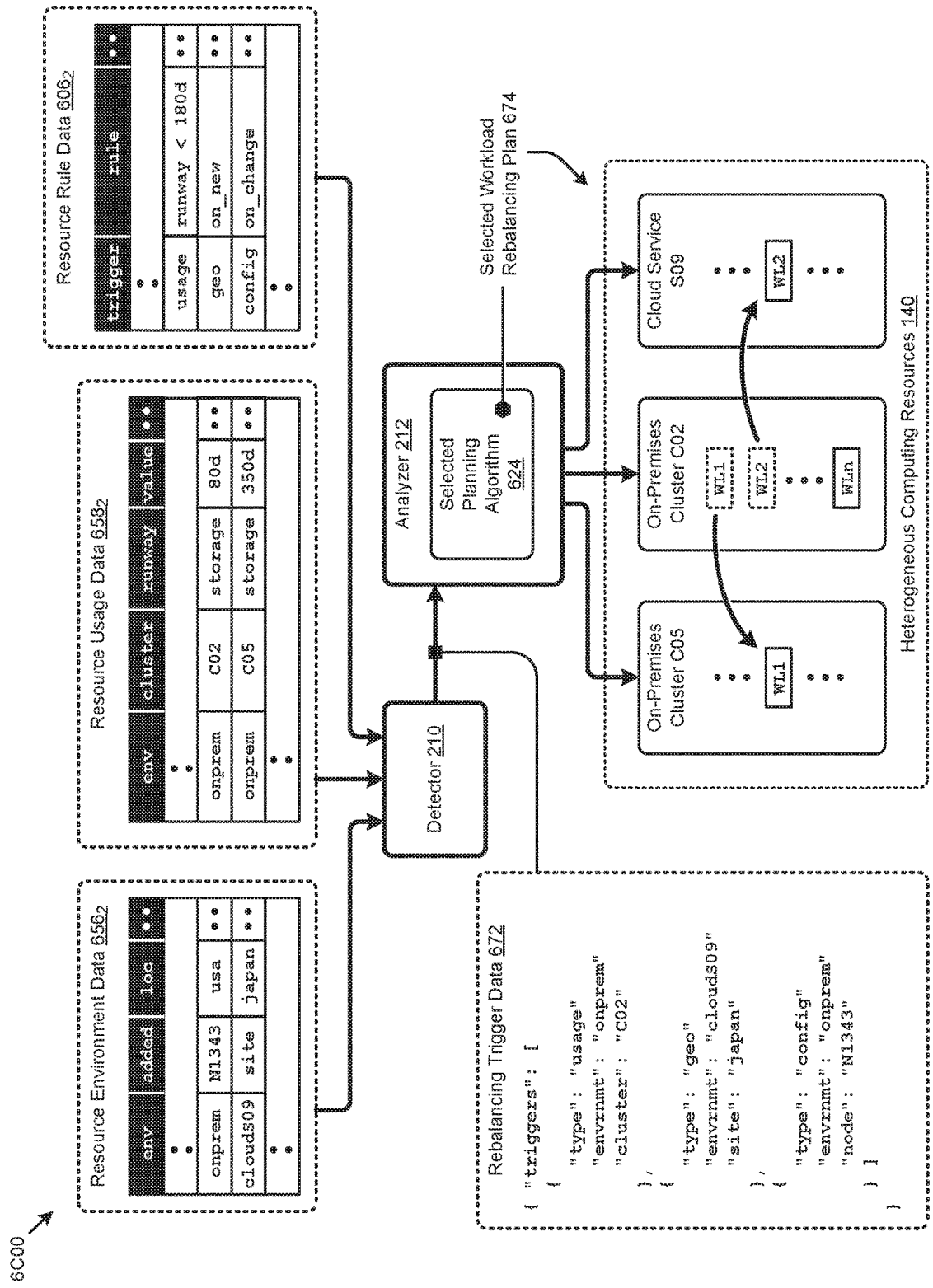
FIG. 6C illustrates a workload rebalancing plan selection technique as implemented by systems that schedule resources across highly dynamic heterogeneous resource environments, according to an embodiment.

FIG. 6C illustrates a workload rebalancing plan selection technique 6C00 as implemented by systems that schedule resources across highly dynamic heterogeneous resource environments. As an option, one or more variations of workload rebalancing plan selection technique 6C00 or any aspect thereof may be implemented in the context of the architecture and functionality of the embodiments described herein. The workload rebalancing plan selection technique 6C00 or any aspect thereof may be implemented in any environment.

FIG. 6C illustrates merely one example of the data and data structures exposed to detector 210 and analyzer 212 for selecting a workload rebalancing plan (e.g., selected workload rebalancing plan 674) according to the herein disclosed techniques. Specifically, workload rebalancing plan selection technique 6C00 depicts example tabular representations of examples of resource environment data 656$_2$, resource usage data 658$_2$, and resource rule data 606$_2$ received by detector 210. Further shown is a structured data interchange format representation of examples of rebalancing trigger data 672 received by analyzer 212. Resource environment data 656$_2$ indicates that a node "N1343" in the "usa" is added to an on-premises (e.g., "onprem") resource environment. Resource environment data 656$_2$ also indicates that a "site" in "japan" is added by cloud service provider "clouds09". Resource usage data 658$_2$ indicates a cluster "C02" in an "onprem" environment has a "storage" runway of "80 d" and a cluster "C05" in the "onprem" environment has a "storage" runway of "350 d". Further, resource rule data 606$_2$ specifies a "usage" trigger that is activated when any resource runway is less than 180 days (e.g., "runway<180 d"). Resource rule data 606$_2$ also specifies a "geo" trigger that is activated when a new site geography is detected (e.g., "on new"), and a "config" trigger that is activated when any configuration change is detected (e.g., "on change").

The foregoing data is received by detector 210 to determine one or more rebalancing triggers as indicated by the received data. As can be observed by the rebalancing trigger data 672, at least three triggers derive from the received data at detector 210. Specifically, rebalancing trigger data 672 indicates a "usage" trigger associated with cluster "C02" in the "onprem" resource environment (see resource usage data 658$_2$ and resource rule data 606$_2$). Rebalancing trigger data 672 further indicates a "geo" trigger pertaining to the new "japan" site of cloud service provider "cloudS09", and a "config" trigger corresponding to the new "N1343" node in the "onprem" resource environment.

The foregoing rebalancing trigger data and other resource data can be received by the analyzer 212 to determine the selected workload rebalancing plan 674. According to certain embodiments of the herein disclosed techniques, the workload rebalancing plan can be determined using a selected planning algorithm 624 that is selected based in part on the rebalancing triggers detected. The scope of the analysis by selected planning algorithm 624 can be constrained by selecting a portion of the resource environment data 656$_2$, resource usage data 658$_2$, and/or resource rule data 606$_2$ based at least in part on the rebalancing trigger data 672. As an example, the portion of analysis data selected might merely comprise data associated with resources in close logical and/or physical proximity to cluster "C02", the "japan" site of "clouds09", and/or node "N1343". In some cases, selecting the analysis algorithm and/or the scope of data to be analyzed can serve to improve the performance (e.g., speed, resource consumption, etc.) of the rebalancing operation. As illustrated in FIG. 6C, the selected workload rebalancing plan 674 moves certain workloads (e.g., WL1 and WL2) across the heterogeneous computing resources 140 from on-premises cluster C02 to on-premises cluster C05 for WL1, and from on-premises cluster C02 to cloud service S09 (e.g., at the Japan site) for WL2.

The components, data flows, and data structures shown in FIG. 6A, FIG. 6B and FIG. 6C present merely one partitioning and an associated data manipulation approach. The specific example shown is purely exemplary, and other subsystems and/or partitioning are reasonable.

Figure 7:
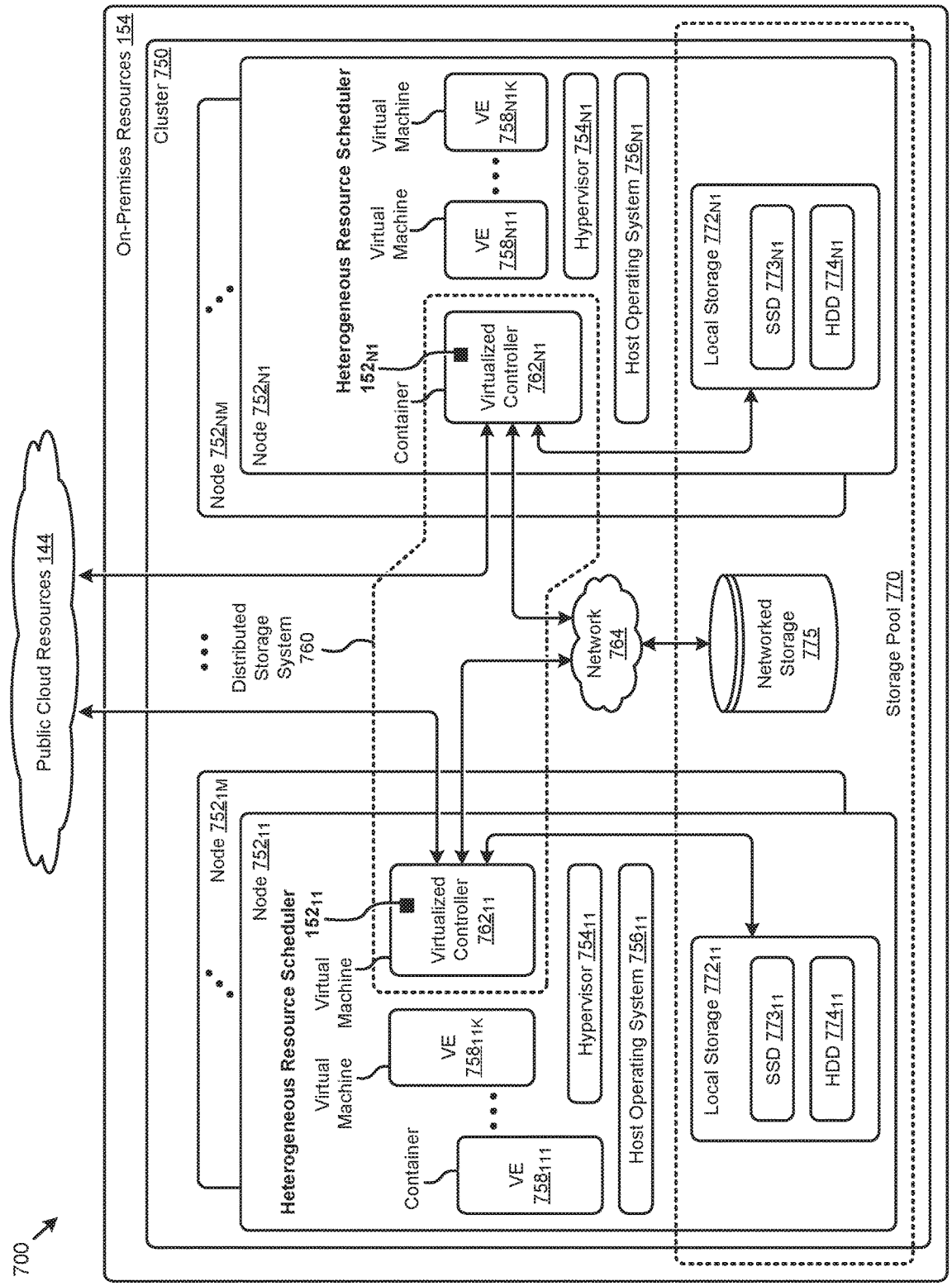
FIG. 7 depicts a distributed virtualization environment in which embodiments of the present disclosure can operate.

One embodiment of an environment for implementing any of the herein disclosed techniques is shown and described as pertaining to FIG. 7.

FIG. 7 depicts a distributed virtualization environment 700 in which embodiments of the present disclosure can operate. As an option, one or more variations of distributed virtualization environment 700 or any aspect thereof may be implemented in the context of the architecture and functionality of the embodiments described herein. The distributed virtualization environment 700 or any aspect thereof may be implemented in any environment.

The shown distributed virtualization environment depicts various components associated with one instance of a computing system (e.g., hyperconverged distributed system) comprising a distributed storage system 760 that can be used to implement the herein disclosed techniques. Specifically, the distributed virtualization environment 700 comprises one or more clusters (e.g., cluster 750) comprising multiple nodes (e.g., node $752_{11}$, . . . , node $752_{1M}$, node $752_{N1}$, . . . , node $752_{NM}$) that have multiple tiers of storage in a storage pool 770. For example, each node can be associated with one server, multiple servers, or portions of a server. The nodes can be associated (e.g., logically and/or physically) with the clusters. As shown, the multiple tiers of storage include storage that is accessible through a network 764, such as a networked storage 775 (e.g., a storage area network or SAN, network attached storage or NAS, etc.). The multiple tiers of storage further include instances of local storage (e.g., local storage $772_{11}$, . . . , local storage $772_{N1}$). For example, the local storage can be within or directly attached to a server and/or appliance associated with the nodes. Such local storage can include solid state drives (SSD $773_{11}$, . . . , SSD $773_{N1}$), hard disk drives (HDD $774_{11}$, . . . , HDD $774_{N1}$), and/or other storage devices. As shown, the nodes, clusters, storage pool, and/or other resources associated with the distributed storage system 760 can comprise a set of resources referred to as on-premises resources 154.

As shown, the nodes in distributed virtualization environment 700 can implement one or more user virtualized entities (e.g., VE $758_{111}$, . . . , VE $758_{11K}$, . . . , VE $758_{N11}$, . . . , VE $758_{N1K}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $756_{11}$, . . . , host operating system $756_{N1}$), while the VMs run multiple applications on various respective guest operating systems. Such flexibility can be facilitated at least in part by a hypervisor (e.g., hypervisor $754_{11}$, hypervisor $754_{N1}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $756_{11}$, . . . , host operating system $756_{N1}$) with, in most cases, no hypervisor layer. This lightweight implementation can facilitate efficient distribution of certain software components, such as applications or services (e.g., micro-services). As shown, distributed virtualization environment 700 can implement both a hypervisor-assisted virtualization environment and a container virtualization environment for various purposes.

This specific embodiment of the distributed virtualization environment 700 also comprises a virtualized controller to facilitate access to storage pool 770 and to public cloud resources 144 by the VMs and/or containers. As used in these embodiments, a virtualized controller is a collection of software instructions that serve to abstract details of underlying hardware or software components from one or more higher-level processing entities. A virtualized controller can be implemented as a virtual machine (e.g., on a hypervisor layer) or as a container (e.g., a Docker container).

Multiple instances of such virtualized controllers can coordinate within a cluster to form the distributed storage system 760 which can, among other operations, manage the storage pool 770. This architecture further facilitates efficient scaling of the distributed virtualization system. The foregoing virtualized controllers can be implemented in distributed virtualization environment 700 using various techniques. Specifically, an instance of a virtual machine at a given node can be used as a virtualized controller in a hypervisor-assisted virtualization environment to manage storage and I/O activities. In this case, for example, the virtualized entities at node $752_{11}$ can interface with a controller virtual machine (e.g., virtualized controller $762_{11}$) through hypervisor $754_{11}$ to access the storage pool 770. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 760.

For example, a hypervisor at one node in the distributed storage system 760 might correspond to VMware ESXi software, and a hypervisor at another node in the distributed storage system 760 might correspond to Nutanix AHV software. As another virtualized controller implementation example, containers (e.g., Docker containers) can be used to implement a virtualized controller (e.g., virtualized controller $762_{N1}$) in an operating system virtualization environment at a given node. In this case, for example, the virtualized entities at node $752_{N1}$ can access the storage pool 770 by interfacing with a controller container (e.g., virtualized controller $762_{N1}$) through hypervisor $754_{N1}$ and/or the kernel of host operating system $756_{N1}$.

In certain embodiments, one or more instances of a heterogeneous resource scheduler can be implemented in the distributed storage system 760 to facilitate the herein disclosed techniques. Specifically, heterogeneous resource scheduler $152_{11}$ can be implemented in the virtualized controller $762_{11}$, and heterogeneous resource scheduler $152_{N1}$ can be implemented in the virtualized controller $762_{N1}$. Such instances of the heterogeneous resource scheduler can be implemented in any node in any cluster. As can be observed, the workload placement and/or rebalancing techniques facilitated by one or more instances of the heterogeneous resource scheduler at the virtualized controllers can be implemented across the heterogeneous resource environments comprising the on-premises resources 154, the public cloud resources 144, and/or other resource environments.

Additional Embodiments of the Disclosure

Additional Practical Application Examples

Figure 8:
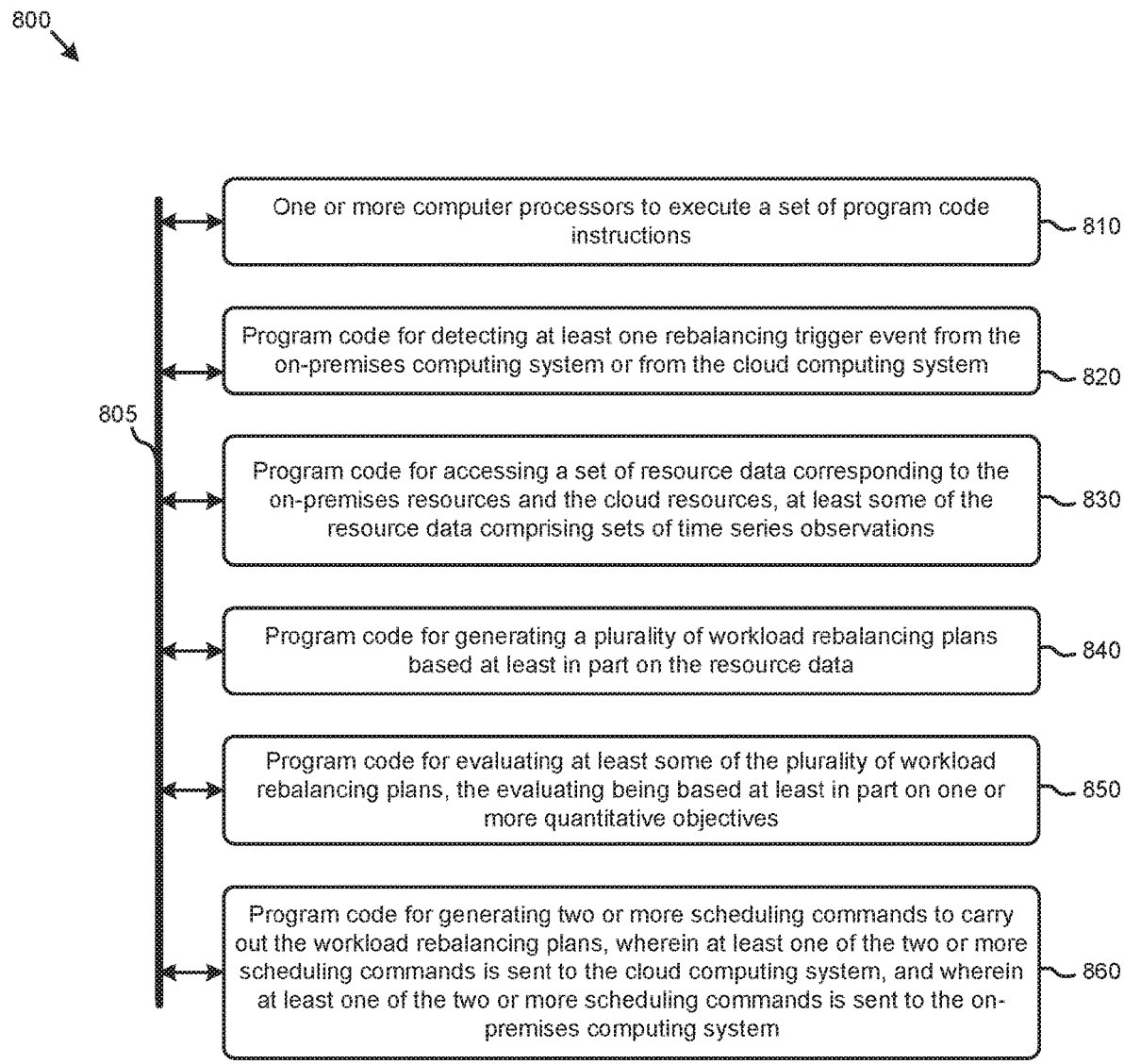
FIG. 8 depicts system components in an arrangement of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that individually, and/or as combined, serve to form improved technological processes that address efficient distribution of workloads across highly dynamic hyperconverged distributed resource environments and cloud-based resource environments. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: detecting at least one rebalancing trigger event from the on-premises computing system or from the cloud computing system (module 820); accessing a set of resource data corresponding to the on-premises resources and the cloud resources, at least some of the resource data comprising sets of time series observations (module 830); generating a plurality of workload rebalancing plans based at least in part on the resource data (module 840); evaluating at least some of the plurality of workload rebalancing plans, the evaluating being based at least in part on one or more quantitative objectives (module 850); and generating two or more scheduling commands to carry out the workload rebalancing plans, wherein at least one of the two or more scheduling commands is sent to the cloud computing system, and wherein at least one of the two or more scheduling commands is sent to the on-premises computing system (module 860).

Variations of the foregoing may include more or fewer of the shown modules. Certain variations may perform more or fewer (or different) steps, and/or certain variations may use data elements in more, or in fewer (or different) operations.

System Architecture Overview

Additional System Architecture Examples

Figure 9A:
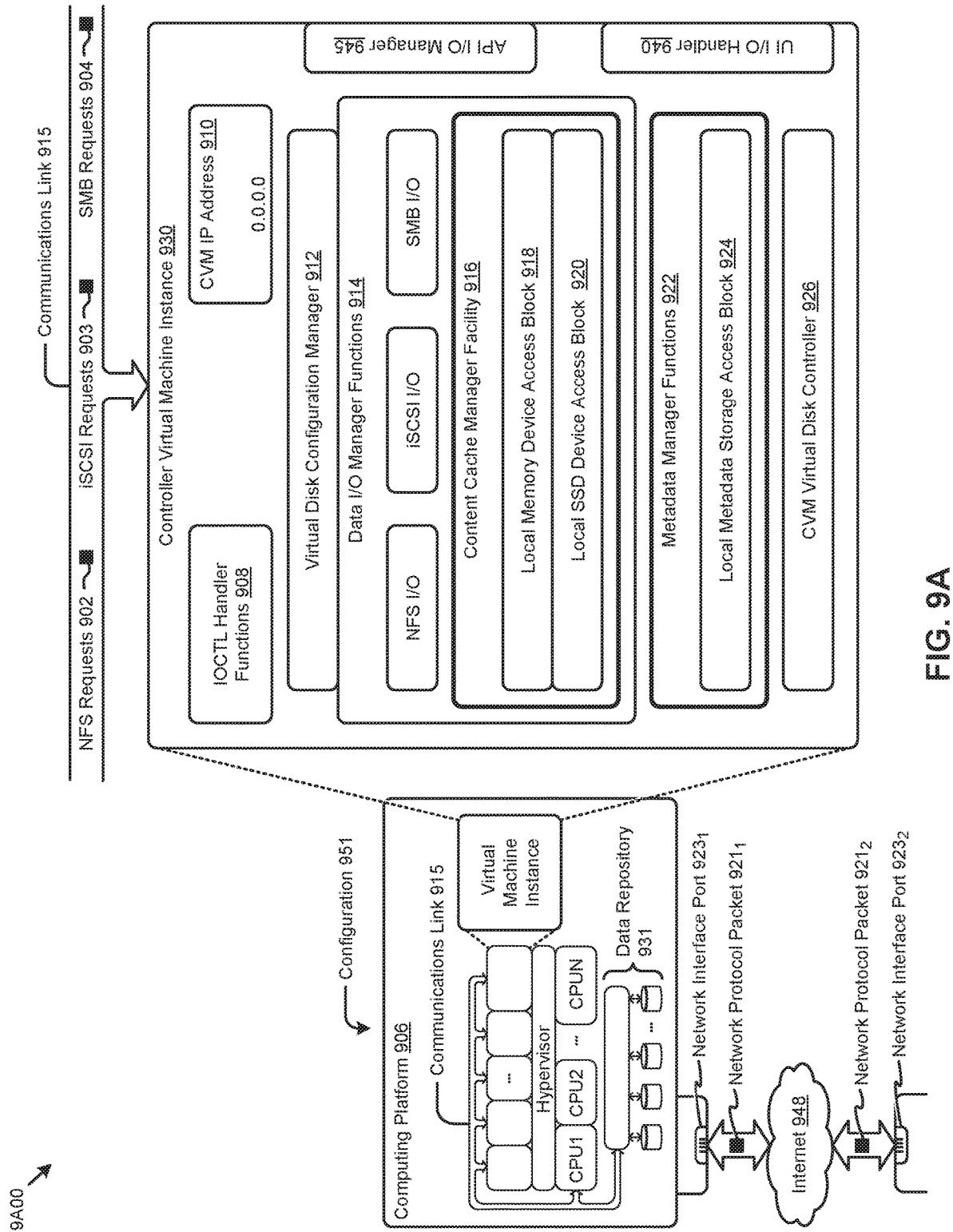
FIG. 9A, FIG. 9B, and FIG. 9C depict virtualized controller architectures comprising collections of interconnected components suitable for implementing embodiments of the present disclosure and/or for use in the herein-described environments.

FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, the virtual machine architecture 9A00 comprises a collection of interconnected components suitable for implementing embodiments of the present disclosure and/or for use in the herein-described environments. Moreover, the shown virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O as received from any or every source within the computing platform. An example implementation of such a virtual machine that processes storage I/O is depicted as 930.

In this and other configurations, a controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through the shown API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 930 includes content cache manager facility 916 that accesses storage locations, possibly including local dynamic random access memory (DRAM) (e.g., through the local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). External data repository 931 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 924. External data repository 931 can be configured using CVM virtual disk controller 926, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$ and network interface port $923_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet $921_1$ and network protocol packet $921_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to the other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to scheduling workloads across highly dynamic heterogeneous resource environments. In some embodiments, a module may include one or more state machines and/or combinational logic used to implement or facilitate the operational and/or performance characteristics pertaining to scheduling workloads across highly dynamic heterogeneous resource environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of scheduling workloads across highly dynamic heterogeneous resource environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to scheduling workloads across highly dynamic heterogeneous resource environments, and/or for improving the way data is manipulated when performing computerized operations pertaining to continually monitoring resource requirements and capacity from multiple heterogeneous resource environments to determine workload scheduling operations according to one or more objectives and/or constraints. In one specific case, as heretofore disclosed, a workload can be split between heterogeneous computing environments so as to reduce aggregate resource usage.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
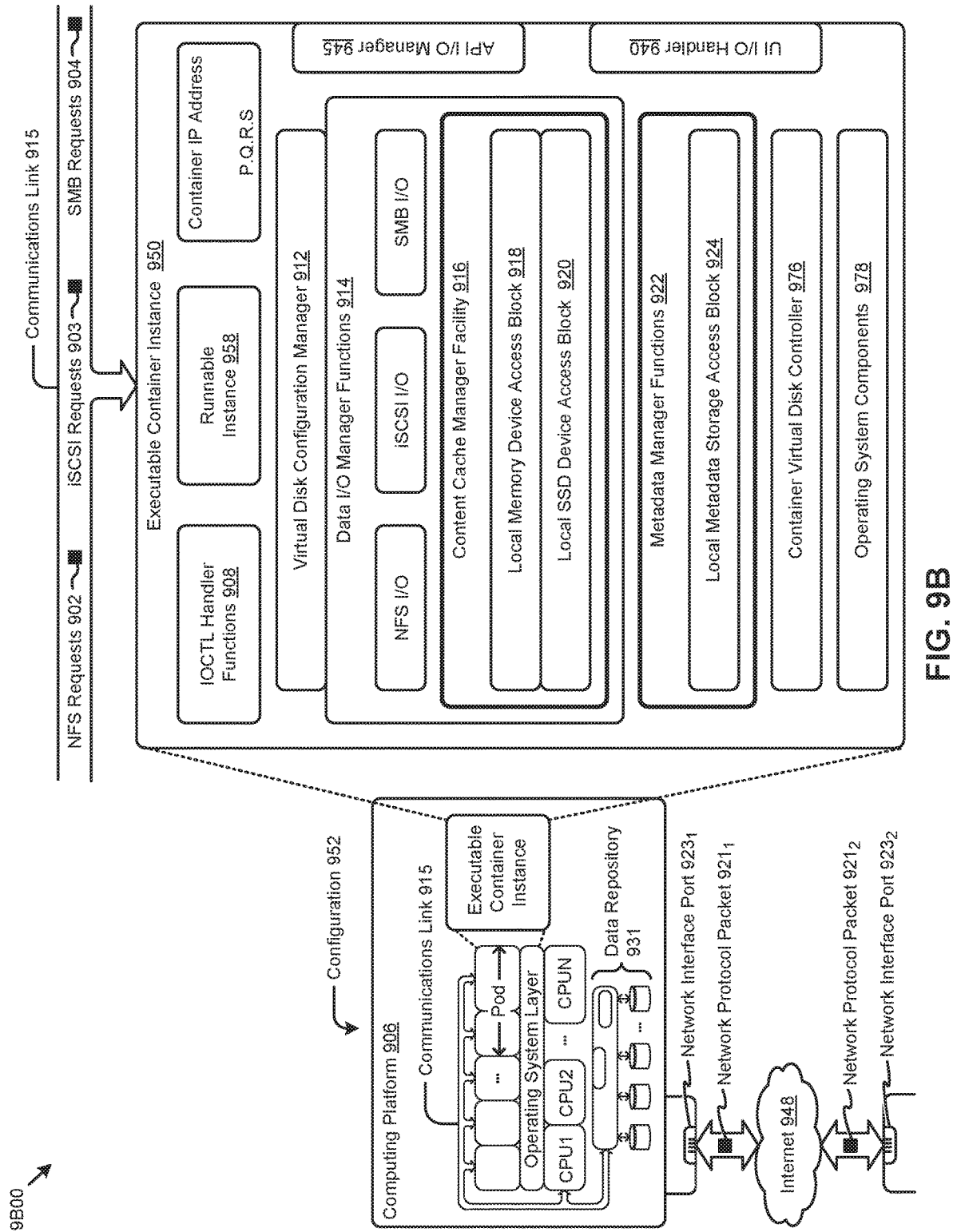

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to the executable container instance 950. Configuration 952 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
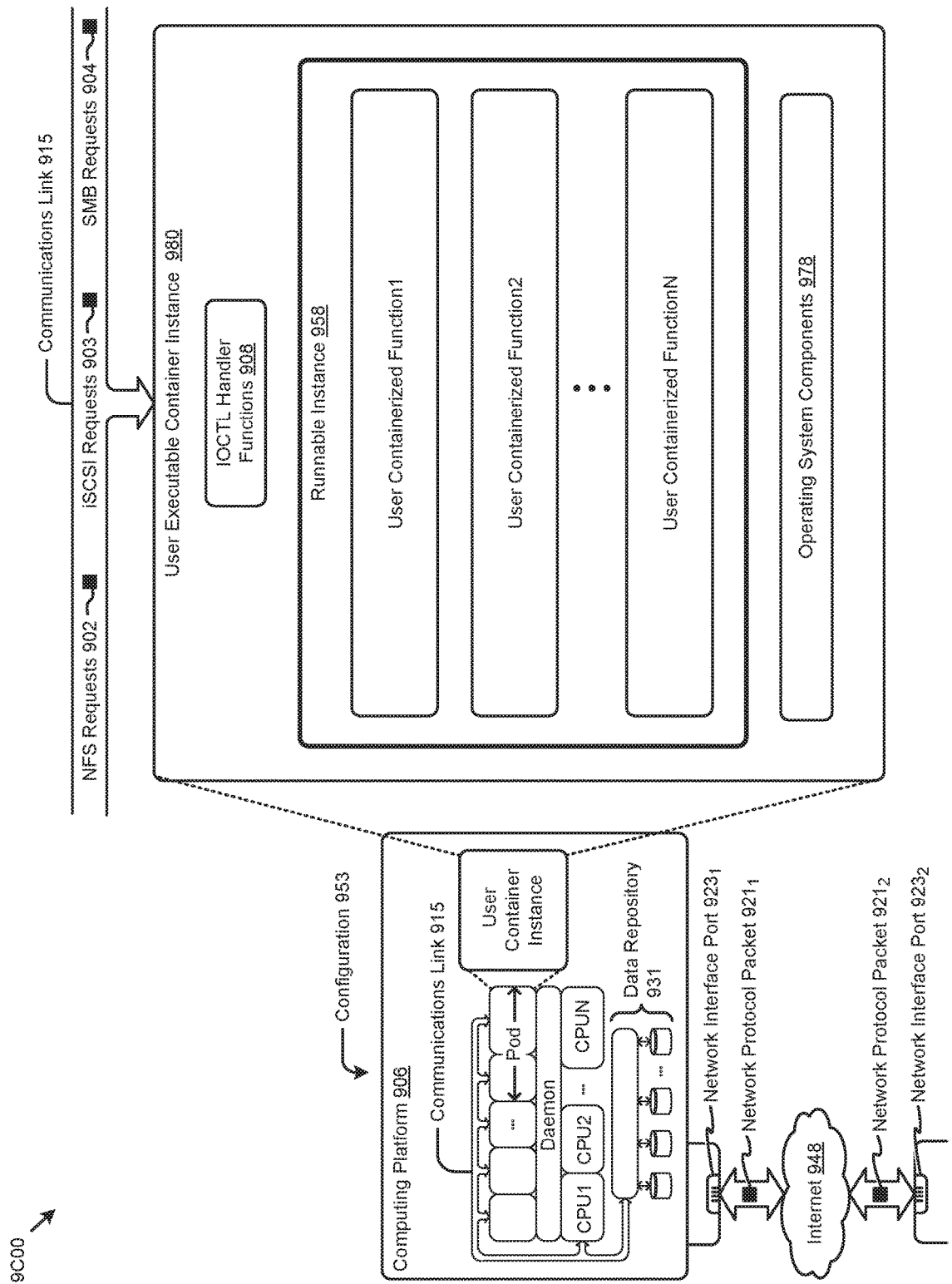

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown daemon-assisted containerized architecture 9C00 includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this daemon-assisted containerized architecture, computing platform 906 might or might not host operating system components other than operating system components 978. More specifically, the shown container daemon might or might not host operating system components other than operating system components 978 of user executable container instance 980.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
monitoring an on-premises computing system and a cloud computing system to detect a rebalancing trigger event, wherein the rebalancing trigger event is detected by applying a rebalancing trigger rule emitted by a machine learning module, a detector module, or a constraint satisfaction algorithm, or wherein the rebalancing trigger rule comprises a manually-specified trigger rule or a threshold-sensitive rule; and
dynamically rebalancing a workload in response to the rebalancing trigger event by:
generating a workload rebalancing plan based at least in part on resource usage data from the on-premises computing system and from the cloud computing system, the workload rebalancing plan specifying movement of the workload between the on-premises computing system and the cloud computing system; and
initiating the workload rebalancing plan by executing a command to move the workload between the on-premises computing system and the cloud computing system.

2. The method of claim 1, wherein the workload rebalancing plan comprises a workload attribute translation instruction.

3. The method of claim 2, wherein the workload attribute translation instruction comprises a binary image of a virtual machine or container, an installation specification pertaining to the virtual machine or container, a configuration specification pertaining to the virtual machine or container, an instruction to use a particular hypervisor type or container daemon, an instruction to create the virtual machine or container, or an instruction to register a migrated workload with the virtual machine or the container.

4. The method of claim 1, wherein the workload rebalancing plan comprises a scheduling command to carry out the workload rebalancing plan.

5. The method of claim 1, wherein the resource usage data corresponds to an on-premises resource of the on-premises computing system and to a cloud resource of the cloud computing system, resource usage data corresponding to the on-premises resource being received using a first application programming interface (API) and resource usage data corresponding to the cloud resource being received using a second API.

6. The method of claim 1, wherein generating the workload rebalancing plan is also based on resource environment data, and resource rule data, and the resource usage data, the resource environment data and the resource rule data is represented using a structured data interchange format.

7. The method of claim 1, wherein the rebalancing trigger rule is associated with a resource usage, a resource configuration, a resource geography, a resource functionality, a workload, a policy, a rebalancing schedule, or a resource usage cost.

8. The method of claim 1, wherein the rebalancing trigger rule is emitted by the machine learning module.

9. The method of claim 1, wherein the workload rebalancing plan is generated using a planning algorithm selected from a plurality of algorithms based at least in part on the rebalancing trigger event.

10. The method of claim 9, wherein the planning algorithm is a multi-objective optimization algorithm or a logistic regression algorithm.

11. A non-transitory computer readable medium having stored thereon a sequence of instructions which, when executed by a processor performs a set of acts comprising:
monitoring an on-premises computing system and a cloud computing system to detect a rebalancing trigger event, wherein the rebalancing trigger event is detected by applying a rebalancing trigger rule emitted by a machine learning module, a detector module, or a constraint satisfaction algorithm, or wherein the rebalancing trigger rule comprises a manually-specified trigger rule or a threshold-sensitive rule; and
dynamically rebalancing a workload in response to the rebalancing trigger event by:
generating a workload rebalancing plan based at least in part on resource usage data from the on-premises computing system and from the cloud computing system, the workload rebalancing plan specifying movement of the workload between the on-premises computing system and the cloud computing system; and
initiating the workload rebalancing plan by executing a command to move the workload between the on-premises computing system and the cloud computing system.

12. The computer readable medium of claim 11, wherein the workload rebalancing plan comprises a workload attribute translation instruction.

13. The computer readable medium of claim 12, wherein the workload attribute translation instruction comprises a binary image of a virtual machine or container, an installation specification pertaining to the virtual machine or container, a configuration specification pertaining to the virtual machine or container, an instruction to use a particular hypervisor type or container daemon, an instruction to create the virtual machine or container, or an instruction to register a migrated workload with the virtual machine or the container.

14. The computer readable medium of claim 11, wherein the workload rebalancing plan comprises a scheduling command to carry out the workload rebalancing plan.

15. The computer readable medium of claim 11, wherein the resource usage data corresponds to an on-premises resource of the on-premises computing system and to a cloud resource of the cloud computing system, resource usage data corresponding to the on-premises resource being received using a first application programming interface (API) and resource usage data corresponding to the cloud resource being received using a second API.

16. The computer readable medium of claim 11, wherein generating the workload rebalancing plan is also based on resource environment data, and resource rule data, and the resource usage data, the resource environment data and the resource rule data is represented using a structured data interchange format.

17. The computer readable medium of claim 11, wherein the rebalancing trigger rule is emitted by the machine learning module.

18. A system comprising:
a storage medium having stored thereon a sequence of instructions; and
a processor that executes the sequence of instructions to perform a set of acts comprising:
monitoring an on-premises computing system and a cloud computing system to detect a rebalancing trigger event, wherein the rebalancing trigger event is detected by applying a rebalancing trigger rule emitted by a machine learning module, a detector module, or a constraint satisfaction algorithm, or wherein the rebalancing trigger rule comprises a manually-specified trigger rule or a threshold-sensitive rule; and
dynamically rebalancing a workload in response to the rebalancing trigger event by:
generating a workload rebalancing plan based at least in part on resource usage data from the on-premises computing system and from the cloud computing system, the workload rebalancing plan specifying movement of the workload between the on-premises computing system and the cloud computing system; and
initiating the workload rebalancing plan by executing a command to move the workload between the on-premises computing system and the cloud computing system.

19. The system of claim 18, wherein the workload rebalancing plan comprises a workload attribute translation instruction.

20. The system of claim 19, wherein the workload attribute translation instruction comprises a binary image of a virtual machine or container, an installation specification pertaining to the virtual machine or container, a configuration specification pertaining to the virtual machine or container, an instruction to use a particular hypervisor type or container daemon, an instruction to create the virtual machine or container, or an instruction to register a migrated workload with the virtual machine or the container.

21. The system of claim 18, wherein generating the workload rebalancing plan is also based on resource environment data, and resource rule data, and the resource usage data, the resource environment data and the resource rule data is represented using a structured data interchange format.

22. The system of claim 18, wherein the rebalancing trigger rule is emitted by the machine learning module.

* * * * *